(12) United States Patent
Bhutani et al.

(10) Patent No.: US 11,832,368 B2
(45) Date of Patent: *Nov. 28, 2023

(54) STATE RETENTION LOAD CONTROL SYSTEM

(71) Applicant: Lutron Technology Company LLC, Coopersburg, PA (US)

(72) Inventors: Ankit Bhutani, Bethlehem, PA (US); Matthew Knauss, Somerville, MA (US); Timothy Mann, Quakertown, PA (US); Michael W. Pessina, Allentown, PA (US); David T. Saveri, III, Nazareth, PA (US); Matthew J. Swatsky, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,013

(22) Filed: Jul. 27, 2022

(65) Prior Publication Data

US 2022/0360081 A1 Nov. 10, 2022

Related U.S. Application Data

(63) Continuation of application No. 16/670,960, filed on Oct. 31, 2019, now Pat. No. 11,437,814, which is a
(Continued)

(51) Int. Cl.
*H05B 47/19* (2020.01)
*H05B 47/20* (2020.01)
*H02J 13/00* (2006.01)

(52) U.S. Cl.
CPC ............ *H05B 47/19* (2020.01); *H05B 47/20* (2020.01); *H02J 13/00004* (2020.01)

(58) Field of Classification Search
CPC .... H05B 47/19; H05B 47/105; H05B 47/115; H05B 47/185; H05B 47/195
See application file for complete search history.

(56) References Cited

U.S. PATENT DOCUMENTS 5,248,919 A 9/1993 Hanna et al.
5,264,761 A 11/1993 Johnson et al.
(Continued)

FOREIGN PATENT DOCUMENTS

CN 2596671 Y 12/2003
CN 203233569 U 10/2013
(Continued)

*Primary Examiner* — Tung X Le
(74) *Attorney, Agent, or Firm* — Flaster Greenberg, P.C.

(57) ABSTRACT

A device may detect a power removal event, determine whether the power removal event is a local power removal event or a system power removal event, and perform state correction. For example, the device may receive an indication of a state change event turning on the lighting device. The indication may be received from a sensor. For example, the sensor may include a photosensing circuit (e.g., capable of detecting light emission from the lighting device) or the sensor may include a live voltage sensor (e.g., capable of detecting a change in current driven to the lighting device). The device may then determine whether the power removal event is a system power removal event or a local power removal event. If the device determines that the power removal event is a system power removal event, the device may perform state correction (e.g., setting the lighting device to its state prior to the power removal event).

20 Claims, 15 Drawing Sheets

Related U.S. Application Data continuation-in-part of application No. 15/641,933, filed on Jul. 5, 2017, now Pat. No. 10,772,180.

(60) Provisional application No. 62/753,650, filed on Oct. 31, 2018, provisional application No. 62/358,435, filed on Jul. 5, 2016.

(56) References Cited

U.S. PATENT DOCUMENTS

| | | |
|---|---|---|
| 5,905,442 A | 5/1999 | Mosebrook et al. |
| 6,803,728 B2 | 10/2004 | Balasubramaniam et al. |
| 7,190,126 B1 | 3/2007 | Paton |
| 7,834,856 B2 | 11/2010 | Grinshpoon et al. |
| 7,936,281 B2 | 5/2011 | Rigatti et al. |
| 8,009,042 B2 | 8/2011 | Steiner et al. |
| 8,199,010 B2 | 6/2012 | Sloan et al. |
| 8,228,184 B2 | 7/2012 | Blakeley et al. |
| 8,330,638 B2 | 12/2012 | Altonen et al. |
| 8,410,706 B2 | 4/2013 | Steiner et al. |
| 8,451,116 B2 | 5/2013 | Steiner et al. |
| 8,950,461 B2 | 2/2015 | Ogden et al. |
| 9,115,537 B2 | 8/2015 | Blair |
| 9,208,965 B2 | 12/2015 | Busby et al. |
| 9,368,025 B2 | 6/2016 | Carmen |
| 9,374,874 B1 * | 6/2016 | Ewing ................... G08C 17/02 |
| 9,418,802 B2 | 8/2016 | Romano et al. |
| 9,520,247 B1 | 12/2016 | Finnegan et al. |
| 9,583,288 B2 | 2/2017 | Jones et al. |
| 9,633,557 B2 | 4/2017 | Twaddell et al. |
| 9,679,696 B2 | 6/2017 | Bhutani et al. |
| 9,799,469 B2 | 10/2017 | Bailey et al. |
| 9,851,735 B2 | 12/2017 | Dolan et al. |
| 9,907,138 B2 | 2/2018 | Wang et al. |
| 9,959,997 B2 | 5/2018 | Bailey et al. |
| 10,027,127 B2 | 7/2018 | Crafts et al. |
| 10,225,903 B1 | 3/2019 | Fernandez |
| 10,271,407 B2 | 4/2019 | Pessina et al. |
| 2007/0273509 A1 | 11/2007 | Gananathan |
| 2008/0067871 A1 | 3/2008 | Black et al. |
| 2008/0111491 A1 | 5/2008 | Spira et al. |
| 2009/0167196 A1 | 7/2009 | Wang et al. |
| 2009/0206983 A1 | 8/2009 | Knode et al. |
| 2009/0302782 A1 | 12/2009 | Smith et al. |
| 2011/0314163 A1 | 12/2011 | Borins et al. |
| 2012/0013257 A1 | 1/2012 | Sibert |
| 2012/0043889 A1 * | 2/2012 | Recker ................. H05B 45/385 |
| | | 315/86 |
| 2012/0261078 A1 | 10/2012 | Adams et al. |
| 2012/0286940 A1 | 11/2012 | Carmen et al. |
| 2012/0292174 A1 | 11/2012 | Mah et al. |
| 2013/0030589 A1 | 1/2013 | Pessina et al. |
| 2013/0214609 A1 | 8/2013 | Carmen et al. |
| 2014/0001977 A1 | 1/2014 | Zacharchuk et al. |
| 2014/0117871 A1 | 5/2014 | Swatsky et al. |
| 2014/0132475 A1 | 5/2014 | Bhutani et al. |
| 2014/0159588 A1 | 6/2014 | So |
| 2014/0177469 A1 | 6/2014 | Neyhart et al. |
| 2014/0180486 A1 | 6/2014 | Newman et al. |
| 2014/0180487 A1 | 6/2014 | Bull et al. |
| 2014/0231032 A1 | 8/2014 | Blair et al. |
| 2014/0265568 A1 | 9/2014 | Crafts et al. |
| 2014/0265881 A1 | 9/2014 | Karc et al. |
| 2014/0265918 A1 | 9/2014 | Cummings et al. |
| 2015/0005900 A1 | 1/2015 | Steele et al. |
| 2015/0051717 A1 | 2/2015 | Focht et al. |
| 2015/0077021 A1 | 3/2015 | McCarthy et al. |
| 2015/0084547 A1 | 3/2015 | Yeh et al. |
| 2015/0185751 A1 | 7/2015 | Crafts et al. |
| 2015/0185752 A1 | 7/2015 | Riedl et al. |
| 2015/0256028 A1 | 9/2015 | Suman |
| 2016/0073479 A1 | 3/2016 | Erchak et al. |
| 2016/0255698 A1 * | 9/2016 | Harbers ................. H04L 43/087 |
| | | 315/151 |
| 2016/0330825 A1 * | 11/2016 | Recker ................. H05B 47/115 |
| 2016/0353559 A1 | 12/2016 | Mann et al. |
| 2016/0360597 A1 | 12/2016 | Greene |
| 2017/0105176 A1 | 4/2017 | Finnegan et al. |
| 2017/0223807 A1 * | 8/2017 | Recker ..................... H02J 9/02 |
| 2017/0223808 A1 | 8/2017 | Barna et al. |
| 2017/0279300 A1 | 9/2017 | Catalano et al. |
| 2018/0014386 A1 | 1/2018 | Bhutani et al. |
| 2018/0043130 A1 * | 2/2018 | Moore-Ede ............ H05B 47/16 |
| 2018/0190451 A1 | 7/2018 | Scruggs |

FOREIGN PATENT DOCUMENTS

| | | |
|---|---|---|
| CN | 103476186 A | 12/2013 |
| CN | 103857146 A | 6/2014 |
| CN | 103906323 A | 7/2014 |
| CN | 104039035 A | 9/2014 |
| CN | 107949127 A | 4/2018 |
| EP | 2579691 A1 | 4/2013 |
| WO | 2018078027 A1 | 5/2018 |

\* cited by examiner

STATE RETENTION LOAD CONTROL SYSTEM

CROSS-REFERENCE TO RELATED APPLICATIONS

This application is a continuation of U.S. Non-Provisional application Ser. No. 16/670,960, filed Oct. 31, 2019, which claims priority to U.S. Provisional Patent App. No. 62/753,650, filed Oct. 31, 2018, entitled "STATE RETENTION LOAD CONTROL SYSTEM," and is a continuation-in-part of U.S. patent application Ser. No. 15/641,933, filed Jul. 5, 2017, entitled "STATE RETENTION LOAD CONTROL SYSTEM," which claims priority to U.S. Provisional Patent App. No. 62/358,435, filed Jul. 5, 2016. U.S. Non-Provisional application Ser. No. 16/670,960 is incorporated by reference herein in its entirety. U.S. Provisional Patent App. No. 62/753,650 is incorporated by reference herein in its entirety. U.S. patent application Ser. No. 15/641,933 is incorporated by reference herein in its entirety. U.S. Provisional Patent App. No. 62/358,435 is incorporated by reference herein in its entirety.

BACKGROUND

A user environment, such as a residence or an office building, for example, may be configured using various types of load control systems. FIG. 1 depicts a user environment 100. The user environment 100 includes a wall-mounted load control device 110 (e.g., a light switch) coupled in series electrical connection between an AC power source 102 and a light bulb 112 installed in a ceiling mounted downlight fixture 114. The user environment 100 includes a table lamp 124 plugged into an electrical receptacle 126 that is powered by the AC power source 102. The table lamp 124 is plugged into an electrical receptacle 126 via electrical plug 120. Light bulb 122 is installed in table lamp 124. The wall-mounted load control device 110 has an internal mechanical switch that may be opened and closed in response to actuations of a toggle actuator 116 for turning the light bulb 112 on and off The user environment 100 includes a battery-powered handheld remote control device 150 having buttons 152. The battery-powered remote control device 150 transmits RF signals 106 in response to actuations of one or more of the buttons 152. The light bulb 112 and light bulb 122 receive messages (e.g., digital messages) via radio-frequency (RF) signals 106. The RF signals 106 are transmitted by the battery-powered remote control device 150. In response to the received RF signals, the light bulb 112 and/or light bulb 122 turn on and off The user environment may include a bridge and a smartphone or tablet for controlling the light bulbs 112, 122. The bridge transmits RF signals to the light bulbs 112, 122. The bridge receives Wi-Fi signals from the smartphone or tablet for controlling the light bulbs 112, 122 and formats the information in the Wi-Fi signals for being received by the light bulbs 112, 122 on a different protocol.

In user environment 100, a problem arises if power is removed from the light bulb 112 and/or the light bulb 122. The problem arises whether or not a bridge is present in the user environment 100. For example, if power is removed from the light bulbs and returns to the light bulbs, the light bulbs turn on to a default intensity level (e.g., 100% intensity level). As an example, the light bulb 112 may be set to electronic off and the light bulb 122 may be set to an intensity level of eighty percent. Power may intentionally be removed from the light bulb 112 via an actuation of the toggle actuator 116 to the off position. As another example, power may unintentionally be removed from the light bulb 112 and/or the light bulb 122 due a blackout or a brownout. Upon power being returned to the light bulb 112 and the light bulb 122, the light bulb 112 and light bulb 122 may present light at the default intensity (e.g., an intensity level of 100%). During unintentional power removal, it may be undesirable to a user for the light bulb 112 and light bulb 122 to present light at the default intensity. Rather, during an unintentional power removal, the user may desire that the intensity of the light bulbs be returned to their respective pre-power removal states (e.g., electronic off and eighty percent, respectively). For example, during an unintentional power removal, a user may not desire the light bulb 112 and/or the light bulb 122 to operate at the default state of full intensity when the user is asleep or when the user is away from the user environment 100 for an extended period of time. Accordingly, there is a need for the control system to distinguish between an intentional power removal event (based on a user action) and an unintentional power removal event (such as a blackout), so that the light bulbs may behave in an expected manner.

In the user environment 100, multiple devices (e.g., the remote control device 150 via actuations of the buttons 152, and the load control device 110 via actuations of the toggle actuator 116) may control a light source (e.g., the light bulb 112). When multiple devices control a single light source, distinguishing between an intentional power removal event and an unintentional power removal event may be difficult.

SUMMARY

A load control system may include control devices for controlling an amount of power provided to an electrical load. The control devices may include an input device and/or a load control device. The load control devices may be capable of directly controlling an electrical load. The input devices may be capable of indirectly controlling the electrical load via the load control device. For example, the load control device may be capable of controlling the amount of power provided to the electrical load based on messages (e.g., digital messages) received from the input device and/or another device. The digital messages may include load control instructions or another indication that causes the load control device to determine load control instructions for controlling an electrical load.

The control devices may be powered from a power source (e.g., alternating-current (AC) or direct-current (DC) power source). If an inadequate amount of power is provided to the control devices, the control devices may stop functioning. An inadequate amount of power may occur as a result of a power outage (e.g., a blackout, brownout, or other power loss). For example, during a brownout, a control device powered by an AC circuit may be inoperable. Although control devices may receive an inadequate amount of electric power as a result of power outages, control devices may also, or, alternatively, receive an inadequate amount of power in other ways. For example, control devices may receive an inadequate amount of power as a result of a user action, such as the user turning a light switch off that powers control devices or unplugging a power cord that powers the control devices. Power removal events as a result of power outages may be referred to as system power removal events. Power removal events as a result of user actions may be referred to as local power removal events.

A control device may be configured to be controlled to and retain one or more states (e.g., power states). The control device may include memory. The memory may be volatile and/or non-volatile memory. The memory may be used for saving a power state of the control device. A power state of the control devices may include an off power state of the control device, an on power state of the control device, an intensity state (e.g., an intensity level) of the control device, a color (e.g., a color temperature) state of the control device, etc. For example, the control device may store in memory that the power state of a control device is an intensity state of eighty-percent. The power state may be recalled at a later time. For example, a prior power state (e.g., a power state of a control device prior to a power removal event) may be recalled by the control device after the power removal event ends. For example, after a power removal event, a control device may recall that the prior power state of the control device was a particular intensity level, such as eighty-five percent. The control device may recall (e.g., from memory within the control device) the prior power state of the control device, for example, when the power removal event ends. A lighting device, for example, may be set to forty percent prior to a power removal event. Upon the power removal event occurring and the power removal event ending, the control device may recall (e.g., from the memory within the control device) that the prior power state of the lighting device was forty percent. Thus, upon the power removal event ending, the lighting device may function at an intensity of forty percent.

A remote control device (e.g., a remote control device and/or a hub device) may detect a power removal event, determine whether the power removal event is a local power removal event or a system power removal event, and perform state correction. For example, the remote control device may receive an indication of a state change event turning on a lighting device. The indication may be received from a sensor. For example, the sensor may include a photosensing circuit (e.g., capable of detecting light emission from the lighting device) or the sensor may include a live voltage sensor (e.g., capable of detecting a change in current driven to the lighting device). The sensor may be an internal sensor to the remote control device, or an external sensor.

The remote control device may determine whether the power removal event is a system power removal event or a local power removal event. For example, the remote control device may transmit one or more message to the lighting device to determine whether the power removal event is a system power removal event or a local power removal event. If the remote control device receives a response from the lighting device, the remote control device may determine that the lighting device is powered (e.g., a local power removal event). If the remote control device does not receive a response from the lighting device, the remote control device may determine that the lighting device is unpowered (e.g., a system power removal event). Also, or alternatively, the remote control device may transmit one or more queries to determine if the lighting device is flagged as unpowered.

When the remote control device determines that the power removal event is a system power removal event, the remote control device may perform state correction (e.g., setting the lighting device to its state prior to the power removal event). The remote control may transmit a query to determine a previous state of the lighting device. The query may be transmitted to the lighting device. After receiving a response to the query, the remote control device may transmit a command to the lighting device to set the lighting device to the previous state.

DETAILED DESCRIPTION

Figure 1:
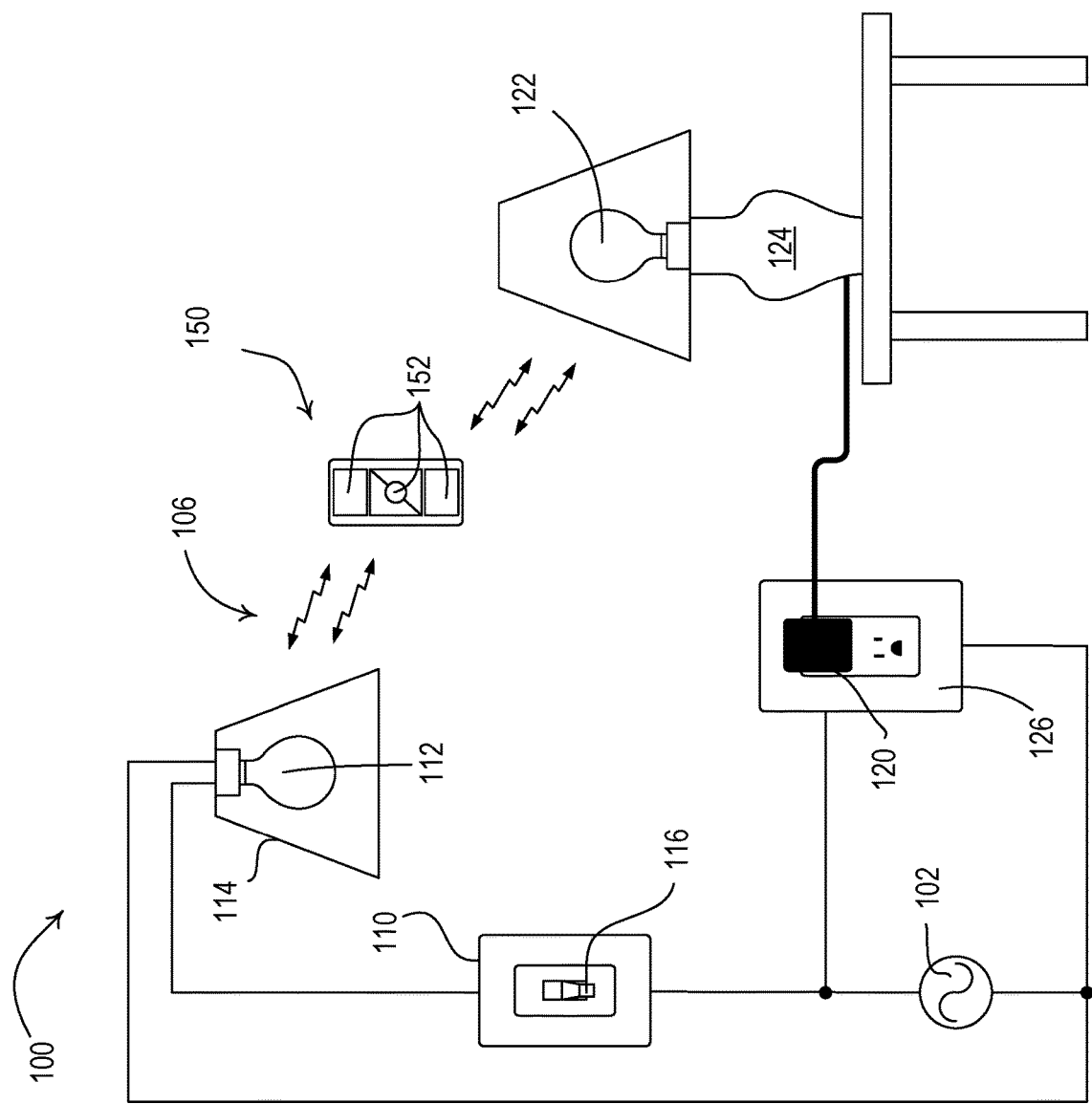
FIG. 1 is an example environment including load control devices.
Figure 2A:
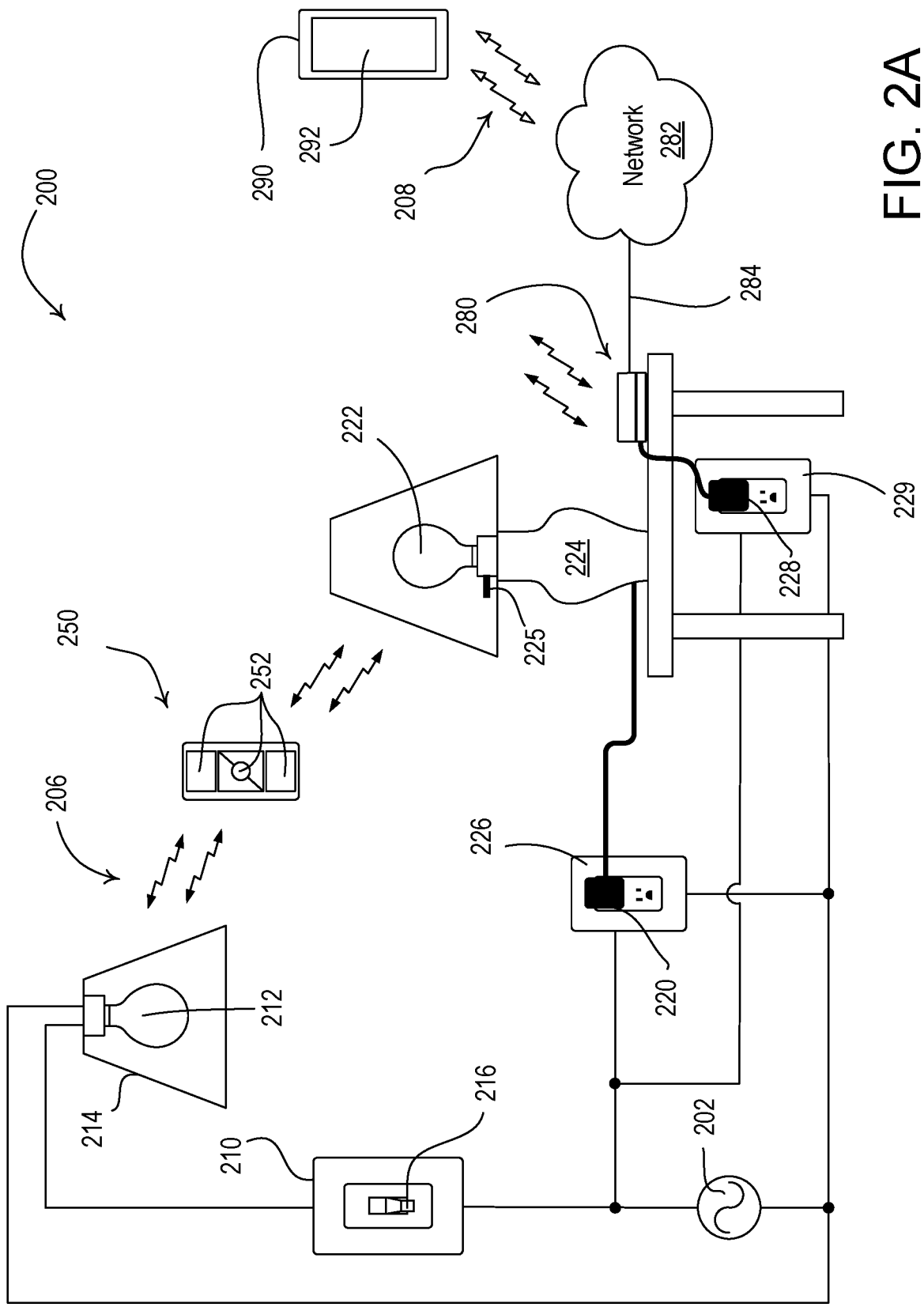
FIGS. 2A-2D are perspective views of example environments for adjusting and/or retaining state information of control devices.

FIG. 2A is a diagram of an example load control system 200 (e.g., a lighting control system) in which one or more lighting devices, such as wirelessly-controllable light bulbs 212, 222 (e.g., lighting loads) may be deployed. The load control system 200 may comprise a wall-mounted load control device 210 (e.g., a mechanical switch, such as, a toggle switch, a paddle switch, a pushbutton switch, a "light switch," or other suitable switch), which may be coupled in series electrical connection between an alternating-current (AC) power source 202 and the first light bulb 212. In one example, the lighting devices or light bulbs 212, 222 may include both a lighting load (e.g., a light-emitting diode (LED) light source) and a load control device, such as a lighting control device (e.g., may include an internal load control circuit, such as an LED drive circuit). In another example, the lighting devices or light bulbs 212, 222 may include a lighting load, which may be controlled by an external load control device.

The light bulb 212 may be installed in a ceiling-mounted downlight fixture 214. In addition, the light bulb 212 may be installed in a wall-mounted lighting fixture or other lighting fixture mounted to another surface. The wall-mounted load control device 210 may include an internal switching mechanism for controlling the power delivered to the light bulb 212. In response to actuations of an actuator (e.g., a toggle actuator 216), the wall-mounted load control device 210 may be configured to close and open the switching mechanism to turn the light bulb 212 on and off, respectively. Because the wall-mounted load control device 210 may be configured to turn the light bulb 212 on and off (e.g., the light bulb 212 is downstream of the wall-mounted load control device 210), the light bulb 212 may be considered to be a switched electrical device. The wall-mounted load control device 210 may be adapted to be wall-mounted in a standard electrical wallbox.

The second light bulb 222 may be installed in a lamp (e.g., a table lamp 224). The table lamp 224 may be plugged (e.g., via an electrical plug 220) into an electrical receptacle 226 that is powered by the AC power source 202. The light bulb 222 may be installed in the table lamp 224 or other lamp that may be plugged into the electrical receptacle 226. The table lamp 224 may comprise an internal switching mechanism (not shown) coupled in series between the AC power source 202 and the light bulb 222. The table lamp 224 may also include an actuator 225 for controlling the internal switching mechanism to control the power delivered to the light bulb 222. In response to actuations of the actuator 225 of the table lamp 224, the internal switching mechanism of the table lamp 224 may be configured to turn the light bulb 222 on and off Because the internal switching mechanism of the table lamp 224 may be configured to turn the light bulb 222 on and off (e.g., the light bulb 222 is downstream of the internal switching mechanism of the table lamp 224), the light bulb 222 may be considered to be a switched electrical device.

The load control system 200 may include one or more input devices, e.g., radio-frequency (RF) transmitters, such as a battery-powered handheld remote control device 250. The light bulb 212 and/or the light bulb 222 may be configured to receive digital messages via wireless signals, e.g., radio-frequency (RF) signals 206 (e.g., ZIGBEE®; NFC; BLUETOOTH®; WI-FI®; or a proprietary communication channel, such as CLEAR CONNECT™, etc.). The wireless signals may be transmitted by the battery-powered remote control device 250. In response to the received digital messages, the respective light bulbs 212, 222 may be turned on and off (e.g., a state change event), and/or the intensities of the respective light bulbs 212, 222 may be increased or decreased. The battery-powered remote control device 250 may include one or more actuators 252 (e.g., one or more of an on button, an off button, a raise button, a lower button, or a preset button). The battery-powered remote control device 250 may transmit the RF signals 206 in response to actuations of one or more of the actuators 252. The battery-powered remote control device 250 may be handheld. The battery-powered remote control device 250 may be mounted vertically to a wall, or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 15, 2012, entitled CONTROL DEVICE HAVING A NIGHTLIGHT, the entire disclosures of which are hereby incorporated by reference.

Digital messages transmitted by the input devices (e.g., the battery-powered remote control device 250) may include a command and/or identifying information, such as a serial number (e.g., a unique identifier) associated with the transmitting input device. Each of the input devices may be associated with (e.g., assigned to) the light bulb 212 and/or the light bulb 222 during a configuration procedure of the load control system 200, such that the light bulb 212 and/or the light bulb 222 may be responsive to digital messages transmitted by the input devices via the RF signals 206. Examples of associating wireless control devices during a configuration procedure are described in greater detail in commonly-assigned U.S. Patent Application Publication No. 2008/0111491, published May 15, 2008, entitled RADIO-FREQUENCY LIGHTING CONTROL SYSTEM, and U.S. Patent Application Publication No. 2013/0214609, published Aug. 22, 2013, entitled TWO-PART LOAD CONTROL SYSTEM MOUNTABLE TO A SINGLE ELECTRICAL WALLBOX, the entire disclosures of which are hereby incorporated by reference.

The load control system 200 may include a hub device 280 configured to enable communication with a network 282, e.g., a wireless or wired local area network (LAN). The hub device 280 may be connected to a router via a wired digital communication link 284 (e.g., an Ethernet communication link). The router may allow for communication with the network 282, e.g., for access to the Internet. The hub device 280 may be wirelessly connected to the network 282, e.g., using wireless technology, such as Wi-Fi technology, cellular technology, etc. The hub device 280 may be configured to transmit communication signals (e.g., RF signals 206) to the light bulb 212 and/or the light bulb 222 for controlling the respective light bulbs in response to digital messages received from external devices via the network 282. The hub device 280 may communicate via one or more types of RF communication signals (e.g., ZIGBEE®; NFC; BLUETOOTH®; WI-FI®; cellular; a proprietary communication channel, such as CLEAR CONNECT™, etc.). The hub device 280 may be configured to receive RF signals 206 from the battery-powered remote control device 250, the light bulb 212, and/or the light bulb 222 (e.g., using ZIGBEE®; NFC; BLUETOOTH®; or a proprietary communication channel, such as CLEAR CONNECT™, etc.). The hub device 280 may be configured to transmit digital messages via the network 282 for providing data (e.g., status information) to external devices.

The hub device 280 may operate as a central controller for the load control system 200, and/or relay digital messages between the control devices (e.g., lighting devices) of the load control system and the network 282. The hub device 280 may be plugged (e.g., via electrical plug 228) into an electrical receptacle 229 that is powered by the AC power source 202. The hub device 280 may receive power without being controlled by the same actuator as the light bulbs 212, 222 (e.g., without being controlled by the toggle actuator 216). For example, toggle actuator 216 may not turn the hub device 280 on and off The hub device 280 may receive power from an external power source. For example, the hub device 280 may receive power from a battery. The hub device 280 may be on-site at the load control system 200 or at a remote location. Though the hub device 280 is shown as a single device, the load control system 200 may include multiple hub devices and/or the functionality thereof may be distributed across multiple devices.

The load control system 200 may include a network device 290, such as, a smart phone (for example, an iPhone® smart phone, an Android® smart phone, or a Blackberry® smart phone), a personal computer, a laptop, a wireless-capable media device (e.g., MP3 player, gaming device, or television), a tablet device, (for example, an iPad® handheld computing device), a Wi-Fi or wireless-communication-capable television, or any other suitable network communication or Internet-Protocol-enabled device. The network device 290 may be operable to transmit digital messages in one or more Internet Protocol packets to the hub device 280 via RF signals 208 either directly or via the network 282. For example, the network device 290 may transmit the RF signals 208 to the hub device 280 via a Wi-Fi communication link, a Wi-MAX communications link, a Bluetooth® communications link, a near field communication (NFC) link, a cellular communications link, a television white space (TVWS) communication link, or any combination thereof. The RF signals 208 may be communicated using a different protocol and/or wireless band than the RF signals 206. For example, the RF signals 208 may be configured for Wi-Fi communication or cellular communication, while RF signals 206 may be configured for ZIGBEE® or a proprietary communication channel, such as CLEAR CONNECT™. In another example, the RF signals 208 and the RF signals 206 may be the same. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The network device 290 may include a visual display 292. The visual display 292 may include a touch screen that may include, for example, a capacitive touch pad displaced overtop the visual display, such that the visual display may display soft buttons that may be actuated by a user. The network device 290 may include a plurality of hard buttons, e.g., physical buttons (not shown), in addition to the visual display 292. The network device 290 may download a product control application for allowing a user of the network device 290 to control the load control system 200. In response to actuations of the displayed soft buttons and/or hard buttons, the network device 290 may transmit digital messages to the light bulb 212, the light bulb 222, and/or the hub device 280 through the wireless communications described herein.

The network device 290 may transmit digital messages via the RF signals 208 for controlling the light bulb 212 and/or the light bulb 222. The network device 290 may transmit digital messages to the light bulb 212 and/or the light bulb 222 via the hub device 280 (e.g., using ZIGBEE®; NFC; BLUETOOTH®; or a proprietary communication channel, such as CLEAR CONNECT™, etc.). For example, the network device 290 may transmit digital messages to turn the light bulbs 212, 222 on, off, and/or modify the intensities of respective light bulbs 212, 222. The network device 290 may vary the intensity of the light bulbs 212, 222 by varying the amount of power delivered to the light bulbs 212, 222. For example, the network device 290 may increase or decrease the intensity of the light bulbs 212, 222 from a minimum intensity (e.g., approximately 1%) to a maximum intensity (e.g., approximately 100%). The light bulb 212 and/or the light bulb 222 may communicate with the hub device via RF signals 206 (e.g., to transmit status information). For example, the light bulb 212 and/or the light bulb 222 may be configured to communicate with the hub device 280 (e.g., using ZIGBEE®; NFC; BLUETOOTH®; or a proprietary communication channel, such as CLEAR CONNECT™, etc.) in response to digital messages received from the battery-powered remote control device 250 and/or another cause of change in lighting intensity. The hub device 280 may be configured to transmit RF signals 208 to the network device 290. For example, the RF signals 208 transmitted to the network device 290 may be used for displaying data (e.g., status information) on the visual display 292 of the network device 290.

The operation of the load control system 200 may be programmed and configured using the hub device 280 and/or the network device 290. An example of a configuration procedure for a wireless load control system is described in greater detail in commonly-assigned U.S. Patent Application Publication No. 2014/0265568, published Sep. 18, 2014, entitled COMMISSIONING LOAD CONTROL SYSTEMS, the entire disclosure of which is hereby incorporated by reference.

The lighting devices (e.g., the light bulb 212, the light bulb 222) may include an ability to store information. For example, the light bulb 212 and/or the light bulb 222 may include memory. The memory may be volatile and/or non-volatile memory. The memory may be used for saving one or more states (e.g., power states) of the lighting devices. For example, the light bulb 212 and/or the light bulb 222 may have an on power state and/or an off power state. The on power state of the light bulb 212 and/or the light bulb 222 may be characterized by an intensity state, a color (e.g., a color temperate) state, etc. The intensity state of the light bulb 212 and/or the light bulb 222 may be the intensity level (e.g., 10%, 50%, 80%) of the light bulb 212 and/or the light bulb 222. The light bulbs 212, 222 may be configured to store their respective states in memory. Also, or alternatively, the light bulbs 212, 222 may be configured to store states of other devices in their respective memory. The light bulbs 212, 222 may store one or more power states for retention at a later time.

If the hub device 280 is included in the load control system 200, the hub device 280 may store information. For example, the hub device 280 may include memory that may be volatile and/or non-volatile memory. The memory may be used for saving one or more states (e.g., power states) of the lighting devices and/or one or more states of the hub device 280. For example, the hub device 280 may have a powered state when receiving power and an unpowered state when insufficient power is being received. The hub device 280 may store the power states of the lighting devices and/or the power states of the hub device 280. The hub device 280 may store the intensity states and/or color states of the lighting devices. The hub device 280 may store the power states of lighting devices for retention at a later time.

The hub device 280 may be used to set a state (e.g., power state) of one or more of the lighting devices of the load control system 200 (e.g., the light bulb 212, the light bulb 222). For example, the hub device 280 may be used to set the state of one or more of the lighting devices to an on power state, an off power state, a defined intensity state (e.g., a preset intensity state), a defined color state, etc. The lighting devices may be in the on power state to be controlled to other states, such as the defined intensity state or the defined color state, for example. The lighting devices may change their respective states to be aligned with the states provided by the hub device 280 (e.g., a state change event). The hub device 280 may change the states of the lighting devices to be aligned with the states stored by the hub device 280 when electrical power is being provided to the lighting devices. For example, the hub device 280 may set a state of the light bulb 212 to an on power state. If power is being provided to the light bulb 212 (e.g., the toggle actuator 216 is turned to the on position), the light bulb 212 may be turned to the on power state. If electrical power is not provided to the lighting load (e.g., a power removal event occurs, such as the toggle actuator 216 is turned to the off position), the hub device 280 may not be able to set the light bulb 212 to the on power state and/or to a defined intensity or color. For example, the hub device 280 may be precluded from setting the state of the light bulb 212 to the on power state or to a defined intensity or color if insufficient electrical power is being provided to the light bulb 212 (e.g., a power removal event occurs, such as the toggle actuator 216 is turned to the off position). The hub device 280 may set a state of the light bulb 212 to the off power state. For example, if power is being provided to the light bulb 212 (e.g., the toggle actuator 216 is turned to the on position), the hub device 280 may set the power state of the light bulb 212 to the off power state, based on the information stored by the hub device 280. The network device 290 may be used to set a state (e.g., power state), or not set a state, of one or more lighting devices in a manner similar to the hub device 280.

The hub device 280 and/or the network device 290 may set a state (e.g., a power state) of one or more lighting devices by sending a digital message to the light bulbs 112, 122 (e.g., a state change event). The hub device 280 and/or the network device 290 may send the digital messages directly to the light bulbs 112, 122. The hub device 280 and/or the network device 290 may send the digital messages to the light bulbs 112, 122 via an intermediary device (e.g., via a separate hub device, network device, and/or control device). The digital message may include the power state to which the lighting devices may be set. The light bulbs 112, 122 may set the respective lighting devices to the received power state. The light bulbs 112, 122 may store the received power state. The light bulbs 112, 122 may transmit a digital message to the hub device 280 and/or the network device 290. For example, the light bulbs 112, 122 may transmit a digital message to the hub device 280 and/or the network device 290 as an acknowledgement that the light bulbs 112, 122 have received and/or stored the power state sent by the hub device 280 and/or the network device 290.

The hub device 280 may monitor when the remote control device 250 changes the power state of the lighting devices and update the power states that are stored in memory. The hub device 280 may identify digital messages from the remote control device 250 that are transmitted to control the power state of the lighting devices. In response to the hub device 280 identifying a command to change the power state in the digital messages transmitted from the remote control device 250, the hub device 280 may update the power states stored in memory. The hub device 280 may await a confirmation of the change in power state from the lighting devices before updating the stored power state.

A power state as set by the hub device 280 and/or the network device 290 may be different than the actual state of the lighting devices (e.g., light bulb 212). As described herein, the hub device 280 and/or the network device 290 may be configured to set a power state of the lighting devices (e.g., the light bulb 212). For example, the hub device 280 and/or the network device 290 may set a power state of the light bulb 212 to an on power state. As long as electrical power is provided to the lighting devices, the lighting devices may set their respective power states to the power states provided by the hub device 280 and/or the network device 290. The power states (e.g., on power states) may be overridden by a power removal event during which the actual states of the lighting devices may be different than the power states stored by the hub device 280 and/or the network device 290. For example, if power is removed from the lighting load via a power removal event, the light bulb 212 may be in an off power state. A power removal event may include a user turning the toggle actuator 216 to the off position. For example, if a user turns the toggle actuator 216 to the off position, the light bulb 212 may be turned to an off power state, even if the hub device 280, the network device 290, and/or the remote control device 250 has set the power state of the light bulb 212 to the on power state.

A power removal event may also include a power outage (e.g., a blackout and/or a brownout). For example, power may be removed from the lighting devices if one or more portions (e.g., rooms) of a load control system 200 experiences a blackout, brownout, etc. If power is removed from the light bulb 212 (e.g., via a power removal event, such as a blackout), the light bulb 212 may be turned to an off power state, notwithstanding that the hub device 280, the network device 290, and/or remote control device 250 has set the power state of the light bulb 212 to be an on power state.

The prior power states (e.g., the power states of lighting devices set prior to a power removal event) may be stored by the light bulb 212, the light bulb 222, the hub device 280, the network device 290, and/or stored in an external database (e.g., cloud database) via the network 282. The prior power states of lighting devices may be recalled at a predefined time. The prior power states of the lighting devices may be recalled after a predetermined event (e.g., upon a user action).

A power removal event may be a local power removal event or a system power removal event. A local power removal event may occur as a result of a user controlling the toggle actuator 216 and/or the actuator 225 to an off position. For example, a user may actuate the toggle actuator 216 and/or the actuator 225 in an attempt to turn off the power and/or functionality of the respective light bulbs 212, 222. A single control device or multiple control devices located within a location (e.g., one or more control devices located within a room or controlled by the same switch) may experience a local power removal event. A system power removal event may be a blackout, brownout, or other power removal event that affects the devices in the load control system 200. The hub device 280 may be able to determine whether a power removal event is a system power removal event (e.g., a blackout, brownout, etc.). A system power removal event may involve the removal of power to the hub device 280 and one or more control devices within the load control system 200. In response to the system power removal event, the hub device 280 may operate in an unpowered state (e.g., powered off). The hub device 280 may enter a battery powered mode after detecting the loss of power, or may remain off until the return of power from the AC circuit. The hub device 280 may detect a return to the powered state and may subsequently control the light bulbs 212, 222 to a prior power state (e.g., prior to the loss of power). The light bulbs 212, 222 may also, or alternatively, store their prior power states locally and recall the prior power states after a system power removal event is detected (e.g., via an indication from the hub device 280).

After the lighting devices (e.g., light bulbs 212, 222) and/or the hub device 280 determines that the power removal event is a local power removal event at one of the lighting devices (e.g., the user turning off power to an AC circuit), the lighting devices and/or the hub device 280 may refrain from transmitting a prior power state. After a local power removal event has ended and power is returned to the lighting devices affected by the local power removal event (e.g., the user turning on the power to the AC circuit), lighting devices affected by the local power removal event may turn on to a default intensity level (e.g., maximum intensity level, a defined intensity level, such as eighty-five percent, etc.) or to a prior intensity level. The hub device 280 and/or other lighting devices may refrain from transmitting messages to detect whether a power removal event has occurred and/or from controlling the power state of the affected lighting devices. For example, after the light bulb 222 and/or the hub device 280 determines that a power removal event to the light bulb 212 was a local power removal event (e.g., because toggle actuator 216 was actuated to the off position), the light bulb 222 and/or the hub device 280 may refrain from transmitting a digital message to control the power state of the light bulb 212.

After the lighting devices and/or the hub device 280 determines that the power removal event is a system power removal event (e.g., a brownout, blackout, etc.), the lighting devices and/or the hub device 280 may modify the power states of the lighting devices to the prior power states of the lighting devices. For example, upon the light bulbs 212, 222 and/or the hub device 280 determining that the power removal event to the light bulbs 212, 222 is a system power removal event (e.g., by determining that the light bulb 212 and the light bulb 222 have experienced a power removal event), the light bulbs 212, 222 and/or the hub device 280 may set the power state of the lighting devices to the respective prior power states. Thus, in the event of a system power removal event, the light bulbs 212, 222 may be prevented from operating at an undesirable default intensity level (e.g., maximum intensity level, a defined intensity level, such as eighty-five percent, etc.) when power is returned to the light bulbs 212, 222, and may even remain in an off power state when that is the prior power state of the light bulbs 212, 222 before the system power removal event.

In an example, the light bulb 212 may be in the off power state (e.g., zero percent intensity level), but still receiving power from the AC power source 202. If the light bulb 212 experiences a local power removal event, and power is returned to the light bulb 212, the light bulb 212 may turn on to a default intensity level, such as a maximum intensity level or a defined intensity level, e.g., eighty-five percent. If the light bulb 212 experiences a system power removal event, and the hub device 280 is implemented in the system 200, the hub device 280 may detect the system power removal event and send a digital message that overrides the default intensity level of the light bulb 212 with the stored prior power state (e.g., zero percent intensity level) of the light bulb 212 before the system power removal event. If the light bulb 212 stores the prior power state (e.g., zero percent intensity level) of the light bulb 212 locally and detects that a system power removal event has occurred, the light bulb 212 may override the default power state with the prior power state of the light bulb 212 before the system power removal event and remain in the off power state (e.g., zero percent intensity level). In the examples provided, the light bulb 212 may remain off, or return to another prior power state, in the event of a system power removal event.

The lighting load of the light bulb 212 may operate at the recalled prior power state at a predefined time and/or the lighting load of the light bulb 212 may function according to the recalled prior power state after a predefined duration (e.g., five minutes after the power is returned to the lighting load and/or immediately after the power is returned to the lighting load). For example, upon a system power removal event beginning and ending, the light bulb 212 may recall (e.g., from memory) that the prior power state of the lighting load was an on power state at an intensity state of eighty percent. Upon the power removal event ending, the light bulb 212 may operate the lighting load in the on power state at the intensity state of eighty percent. The lighting load may function at eighty percent in the morning, and/or the lighting load may function at the defined intensity upon a predefined duration (e.g., ten minutes, immediately, etc.) after the power removal event ends.

Other devices (e.g., the hub device 280 and/or the network device 290) within the load control system 200 may be used to coordinate the storage and/or retrieval of power states of lighting devices. The hub device 280 and/or the network device 290 may be used to store power states of lighting devices prior to a power removal event (e.g., as the prior power states). The hub device 280 and/or the network device 290 may coordinate sending messages, such as messages including power states, among lighting devices. A button (e.g., a "soft" button) on the network device 290 may be actuated to set lighting devices to predefined power states. For example, a button on the network device 290 may be actuated to set the light bulb 212 to a power state of forty percent intensity level. Upon the conclusion of a power removal event, the light bulb 212 may be set to the power state set by the network device 290 (e.g., an intensity level of forty percent). The light bulb 212 may retrieve the intensity level of forty percent internally (e.g., from memory within the light bulb 212) and/or the light bulb 212 may retrieve the intensity level of forty percent externally (e.g., from the hub device 280, the network device 290 and/or one or more other lighting devices).

The prior power state may be pushed to the light bulb light bulbs 212, 222 after the identification of the end of the power removal event without the light bulbs 212, 222 sending a request. For example, the hub device 280 and/or the network device 290 may send a digital message to the light bulb 212 that indicates a prior power state to which the light bulbs 212, 222 may each be controlled after the hub device 280 and/or the network device 290 detect the end of a power removal event (e.g., by detecting a change from a powered state to an unpowered state, and back to a powered state).

The hub device 280 and/or the network device 290 may detect the occurrence of a power removal event (e.g., by detecting a change from a powered state to an unpowered state, and back to a powered state) and query the light bulbs 212, 222 to determine whether the light bulbs 212, 222 also experienced the power removal event. The query may include a time or timeframe within which the power removal event was detected at the hub device 280 and/or the network device 290. The time may be a time at which the power removal event began and/or the time at which the power removal event ended. The query may include a device identifier (e.g., unique identifier) of the devices that are intended to respond to the query. The light bulbs 212, 222 may acknowledge whether a power removal event was experienced by transmitting an acknowledgement message to the hub device 280 when the light bulbs 212, 222 experienced the power removal event. The acknowledgement message may include the time and/or timeframe in which the power removal event was detected at the respective light bulbs 212, 222, such that the hub device 280 and/or the network device 290 may determine whether the power removal events coincide between the devices. The hub device 280 and/or the network device 290 may determine that the power removal event is a system power removal event when the queried light bulbs 212, 222 also experienced the power removal event and send the prior power state to the light bulbs 212, 222. The hub device 280 and/or the network device 290 may send to and/or query the light bulbs 212, 222 periodically, at a time of day, and/or aperiodically (e.g., based on a user action).

The light bulbs 212, 222 may transmit a digital message to the hub device 280 that indicates the occurrence of a power removal event without being requested. The digital messages sent from the light bulbs 212, 222 may indicate the power states of the light bulbs 212, 222. The digital messages may indicate whether a power removal event has occurred to one or more other lighting devices. The digital message may identify the lighting devices by a name, a number (e.g., unique identifier), etc. The light bulbs 212, 222 may send to and/or query the hub device 280 and/or the network device 290 periodically, at a time of day, and/or aperiodically (e.g., based on a user action).

The light bulbs 212, 222 may query for a prior power state after detection of a power removal event. For example, the hub device 280 and/or the network device 290 may send a digital message to the light bulb 212 in response to a request for a prior power state by the light bulbs 212, 222 after the occurrence of a power removal event. The light bulbs 212, 222 may send a digital message that indicates that a power removal event occurred, which may be interpreted by the hub device 280 and/or the network device 290 as a request for a prior power state. The digital message may include a time or timeframe associated with the power removal event. If the hub device 280 and/or the network device 290 did not experience the power removal event (e.g., within a coinciding time period), the hub device 280 and/or the network device 290 may prevent the sending of the prior power state.

The light bulbs 212, 222 may send a message to the other devices in the system 200. For example, the light bulb 212 may send a message to the other devices that the light bulb 212 experienced a power removal event, which may indicate that the light bulb 212 has regained power after the power removal event, and the other devices in the system 200 (e.g., the hub device 280, the network device 290 and/or one or more other lighting devices) may send a digital message indicating a power state at which the light bulb 212 should operate.

Though the messages indicating power states and/or identification of power removal events may be described herein as being performed by the hub device 280 and/or the network device 290, such functionality may be implemented at the remote control device 250, and/or at the control devices (e.g., lighting devices) themselves. For example, one or more lighting devices, such as the light bulb 212, the light bulb 222, etc., may be used to store the prior power states, identify the occurrence of a power removal event (e.g., locally and/or by querying other devices), and/or communicate the prior power states to one or more other lighting devices in response to a system power removal event. The digital messages indicating the power states and/or querying for acknowledgement of a power removal event may be received by lighting devices neighboring the lighting devices sending the messages and/or within a similar location as the lighting devices sending the messages. The lighting devices receiving the messages may set their power state to the power state included in the digital messages, or respond to the requests for acknowledgement of a power removal event when such a power removal event has occurred locally.

The lighting devices and/or the hub device 280 may be configured according to one or more locations (e.g., rooms). The lighting devices and/or the hub device 280 may be configured according to one or more sources of power (e.g., AC power source 202). The lighting devices and/or the hub device 280 may be configured according to one or more AC circuits. A lighting devices and/or the hub 280 may be identified by a corresponding location, AC power source, and/or AC circuit. The location, AC power source, and/or AC circuit corresponding to a lighting device and/or the hub device 280 may be stored by the lighting devices and/or the hub device 280.

The lighting devices and/or the hub device 280 may receive power from one or more AC circuits. For example, the light bulb 212 may receive power from the AC power source 202. The light bulb 212 may receive power from AC power source 202 via an AC circuit. The toggle actuator 216 may be actuated so that power is provided to the light bulb 212 or so that power is not provided to the light bulb 212. The light bulb 222 and the hub device 280 may receive power from the AC power source 202. The light bulb 212 may receive power from the AC power source 202 via an AC circuit that is different than the AC circuit providing power to the light bulb 212. For example, the light bulb 222 may receive power from the electrical receptacle 226 and/or the hub device 280 may receive power from electrical receptacle 229. The electrical receptacles 226, 229 may not be controlled by the actuation of a switch (e.g., the load control device 210 via actuations of the toggle actuator 216). The lighting devices and/or the hub device 280 may identify the light bulb 212 as being controllable by a switch (e.g., the load control device 210). The lighting devices and/or the hub device 280 may identify the light bulb 222 as not being controllable by a switch (e.g., the load control device 210).

The lighting devices and/or the hub device 280 may determine whether power is provided to one or more lighting devices and/or hub devices. The lighting devices and/or the hub device 280 may determine whether power is provided to one or more lighting devices and/or hub devices according to the AC circuits from which the lighting devices and/or the hub device 280 receive electrical power. For example, the lighting devices and/or the hub device 280 may determine if electrical power is provided to the light bulb 212. The lighting devices and/or the hub device 280 may also, or alternatively, determine if electrical power is provided to the light bulb 222 and/or the hub device 280. The lighting devices and/or the hub device 280 may determine the type of power removal event (e.g., local power removal event, system power removal event) by determining if one or more AC circuits have been affected by a power removal event. For example, the hub device 280 may determine that a power removal event is a system power removal event (e.g., a brownout and/or a blackout) by determining that multiple AC circuits (e.g., AC circuits providing electrical power to the light bulb 212, the light bulb 222, and/or the hub device 280) have experienced a power removal event. The lighting devices and/or the hub device 280 may query devices (e.g., lighting devices, the hub device 280, and/or other control devices) connected to different AC circuits to determine if the power removal event is a system power removal event (e.g., a power removal event affecting more than one AC circuit, such as a brownout or blackout) and/or whether the power removal event is a local power removal event (e.g., a power removal event affecting a single AC circuit), such as when a user physically turns off the toggle actuator 216 that controls the light bulb 212. The lighting devices and/or the hub device 280 may query devices positioned within different locations (e.g., rooms) to determine if a power removal event is a system power removal event or a local power removal event.

Setting the power state of the lighting devices to the respective prior power states may be controlled by the user. For example, a user may set the power state of the light bulb 212 to fifteen percent (e.g., when the user is away on vacation). If a system power removal event begins and ends, the user may apply a setting that is stored at the hub device 280 and/or the lighting device 212 to automatically control the light bulb 212 to an intensity level of fifteen percent when power is again provided to the light bulb 212 (e.g., when the power removal event ends). As another example, a user may set the intensity level of the light bulb 212 to zero percent (e.g., prior to the user being away or going to bed). If a system power removal event occurs while the user is away or is in bed, the intensity level that was previously set by the user may be used to control the light bulb 212 to an intensity of zero percent when power is again provided to the light bulb 212 (e.g., when the power removal event ends). The user settings may be stored and applied similar to the prior power state that is stored and applied herein. User settings may be given priority over a prior power state that has been stored after the user settings, or the prior power state may be given priority over the user settings. Although the control devices (e.g., lighting devices) may be configured to provide light at an intensity displayed prior to a system power removal event, this may be disabled by the user. For example, a user may configure the control devices so that they provide light at a default intensity level (e.g., 100% intensity level, 85% intensity level, etc.) upon a system power removal event ending.

The hub device 280 and/or the lighting devices may determine whether a power removal event is a local power removal event or a system power removal event using one or more factors. For example, the hub device 280 and/or the lighting devices may determine that a power removal event is a local power removal event or a system power removal event based on the number of control devices (e.g., lighting devices) that have experienced a power removal event. The hub device 280 and/or the lighting devices may set a threshold for the number of devices that experienced the power removal event indicating that the power removal event was a system power removal event. If each of the lighting devices within a load control system have experienced a power removal event, it may be determined that the power removal event was a system power removal event. If one or more lighting devices within a load control system have not experienced a power removal event at the same time, power removal events experienced by the control devices may be determined to be local power removal events.

The hub device 280 and/or the lighting devices may determine that a power removal event is a local power removal event or a system power removal event based on the type of the control devices that have experienced a power removal event. Some control devices may not be downstream of a switch (e.g., the wall-mounted load control device 210). For example, a dimmer device may not be downstream of a switch and may be configured to control the power delivered to a lighting device, such as a dimmable light source. Other devices may be downstream of a switch. The light bulb 212, shown in FIG. 2A, may be an example of a device that is downstream of a switch.

A weighting factor may be used for determining whether a power removal event is a local power removal event or a system power removal event. For example, control devices (e.g., lighting devices) not downstream of a switch may be provided a higher weight than control devices downstream of a switch, when determining whether a power removal event was a local power removal event or a system power removal event. For example, a dimmer device (such as dimmer device 218, shown in FIG. 2B) experiencing a power removal event may be provide a larger weight than the light bulb 212 experiencing a power removal event, when determining whether a power removal event was a local power removal event or a system power removal event. If the light bulb 212 experiences a power removal event and the dimmer device continues receiving power at the time of the power removal event at the bulb 212, it may be determined that the power removal event experienced by the light bulb 212 is a local power removal event. If dimmer device experiences a power removal event, the hub device 280 and/or the lighting devices may determine that the power removal event experienced by the dimmer device is a system power removal event.

The light bulb 212, the light bulb 222, and the hub device 280 may be electrically coupled to AC power source 202. Although the light bulb 212, the light bulb 222, and the hub device 280 are electrically coupled to the same power source (e.g., AC power source 202), the light bulb 212 is on a different circuit than the light bulb 222 and the hub device 280. The light bulb 212 is electrically coupled to the wall-mounted load control device 210. The light bulb 222 and the hub device 280 are not electrically coupled to the wall-mounted load control device 210. The hub device 280 and/or lighting devices may query more than one control device (e.g., the light bulb 212 and the light bulb 222) to determine if a power removal event is a system power removal event or a local power removal event. The hub device 280 and/or lighting devices may query the hub device 280 and one or more control devices to determine if a power removal event is a system power removal event or a local power removal event. For example, the hub device 280 may query the light bulb 212 and the light bulb 222 to determine if a power removal event is a system power removal event or a local power removal event. If the light bulb 212 experienced a power removal event and the light bulb 222 experienced a power removal event, the hub device 280 may determine that the power removal events are system power removal events (e.g., because more than one control device on more than one AC circuit experienced a power removal event). If the light bulb 212 experienced a power removal event, the light bulb 222 experienced a power removal event, and the hub device 280 experienced a power removal event, it may further be determined that the power removal events are system power removal events. If the light bulb 212 experienced a power removal event and the light bulb 222 did not experience a power removal event, the hub device 280 may determine that the power removal event to the light bulb 212 was a local power removal event (e.g., the light bulb 212 experienced a power removal event when a user turned the toggle actuator 216 to the off position).

The hub device 280 may query control devices and/or hub devices in one or more locations (e.g., rooms) to determine if a power removal event was a system power removal event or a local power removal event. For example, if power removal events occurred within more than one room, the hub device 280 may determine that the power removal event was a system power removal event. The hub device 280 may query, on a periodic basis (e.g., every 10 seconds, 5 minutes, 1 hour, etc.) whether the control devices have experienced a power removal event. The hub device 280 may query, aperiodically (e.g., based on a user actuation at the hub device 280), whether the control devices have experienced a power removal event. Also, or alternatively, the hub device 280 may query control devices to determine if the control devices have experienced a power removal upon the hub device 280 regaining power after experiencing a power removal event.

The control devices (e.g., lighting devices, such as the light bulb 212) may query control devices (e.g., other lighting devices, such as the light bulb 222) to determine whether the control devices have experienced a power removal event. The light bulb 212 may determine whether the light bulb 212 has experienced a power event. The light bulb 212 may determine whether the power removal event of the other control device (e.g., the light bulb 222) and/or the power removal event of the light bulb 212 was a system power removal event or a local power removal event. For example, the light bulb 212 may query the light bulb 222 to determine whether the light bulb 222 has experienced a power removal event. The light bulb 212 may query the light bulb 222 and/or access local storage to determine if the light bulb 222 and/or the light bulb 212 has experienced a power removal event.

The hub device 280 and/or control devices (e.g., lighting devices) may perform a query to determine whether a power removal event occurred, and/or the type of the power removal event, based on one or more conditions. For example, the lighting devices (e.g., the light bulb 212) may perform a query to determine whether a power removal event occurred, and/or the type of the power removal event, after the light bulb 212 loses and regains power. The light bulb 212 may query other lighting devices after regaining power and/or the light bulb 212 may query the hub device 280 after regaining power. After regaining power, the light bulb 212 may query other lighting devices and/or the hub device 280 to determine whether the other lighting devices and/or the hub device 280 have experienced, and/or are experiencing, a power removal event.

If the other lighting devices and/or the hub device 280 have experienced, and/or are experiencing, a power removal event, the light bulb 212 may determine whether the power removal event experienced by the other control devices and/or the hub device 280 occurred at the same time that the light bulb 212 lost power. The light bulb 212 may perform this determination by requesting the time of the power removal events, the duration of the power removal events, etc. For example, if the other control devices and/or the hub device 280 experienced a power removal event at the same time, and/or for the same duration that the light bulb 212 experienced the power removal event, the power removal event may be determined to be a system power removal event. If the other control devices and/or the hub device 280 did not experience a power removal event, and/or if the other control devices and/or the hub device 280 did not experience a power removal event at the same time as the light bulb 212, the power removal event may be determined to be a local power removal event.

The hub device 280 may perform a query to determine whether a power removal event occurred, and/or the type of the power removal event, after the hub device 280 loses and regains power. The hub device 280 may query lighting devices after regaining power. The hub device 280 may query other hub devices after regaining power. After regaining power, the hub device 280 may query other hub devices and/or lighting devices to determine whether the other hub devices and/or lighting devices have experienced, and/or are experiencing, a power removal event.

If the other hub devices and/or the lighting devices have experienced, and/or are experiencing, a power removal event, the hub device 280 may determine whether the power removal event experienced by the other hub devices and/or the lighting devices occurred at the same time that the hub device 280 lost power. The hub device 280 may perform this determination by requesting the time of the power removal events, the duration of the power removal events, etc. For example, if the other hub devices and/or the lighting devices experienced a power removal event at the same time, and/or for the same duration, that the hub device 280 experienced the power removal event, the power removal event may be determined to be a system power removal event. If the other hub devices and/or the lighting devices did not experience a power removal event, and/or if the other hub devices and/or the lighting devices did not experience a power removal event at the same time as the hub device 280, the power removal event may be determined to be a local power removal event.

The hub device 280 and/or the lighting devices may perform a query to determine whether a power removal event occurred, and/or the type of the power removal event, periodically. For example, the hub device 280 and/or the lighting devices may perform a query to determine whether a power removal event occurred, and/or the type of the power removal event at intervals of five minutes, thirty minutes, two hours, etc. The hub device 280 and/or the lighting devices may perform a query to determine whether a power removal event occurred, and/or the type of the power removal event, aperiodically. For example, the hub device 280 and/or the lighting devices may perform a query to determine whether a power removal event occurred, and/or the type of the power removal event, based on a user action and/or based on a time of day. The hub device 280 and/or the lighting devices may perform a query to determine whether a power removal event occurred, and/or the type of the power removal event, based on one or more of the factors, or a combination of the factors, described herein.

The hub device 280 and/or the lighting devices may perform a query to determine whether a power removal event occurred, and/or the type of the power removal event, based on receiving a message from one or more other devices. For example, another control device may send the hub device 280 and/or lighting devices a message. The message may request that the hub device 280 and/or the lighting devices query other control devices and/or hub devices to determine whether a power removal event occurred, and/or the type of the power removal event that may have occurred. The other control devices may send this message to the hub device 280 and/or the lighting devices for one or more reasons. For example, the other control devices may send this message to the hub device 280 and/or the lighting devices after the control devices regain power (e.g., the other control devices regain power after a power removal event). The other control devices may send this message to the hub device 280 and/or the lighting devices, e.g., periodically or aperiodically.

As described above, the light bulb 212, the light bulb 222, and the hub device 280 are coupled to AC power source 202. Although the light bulb 212, the light bulb 222, and the hub device 280 are coupled to the same power source (e.g., AC power source 202), the light bulb 212 is on a different circuit than the light bulb 222 and the hub device 280. The light bulb 212 is coupled to the wall-mounted load control device 210. The light bulb 222 and the hub device 280 are not coupled to the wall-mounted load control device 210. The light bulb 212 may query one or more control devices to determine if a power removal event is a system power removal event or a local power removal event. The light bulb 212 may query the hub device 280 and one or more control devices to determine if a power removal event is a system power removal event or a local power removal event. For example, the light bulb 212 may query the light bulb 222 to determine if a detected power removal event is a system power removal event or a local power removal event. If the light bulb 222 also experienced a power removal event, the light bulb 212 may determine that the power removal events are system power removal events (e.g., because more than one control device on more than one AC circuit experienced a power removal event). If the light bulb 212 experienced a power removal event, the light bulb 222 experienced a power removal event, and the hub device 280 experienced a power removal event, it may further be determined that the power removal events are system power removal events. If the light bulb 212 experienced a power removal event and the light bulb 222 did not experience a power removal event, the light bulb 212 may determine that the power removal event to the light bulb 212 was a local power removal event (e.g., the light bulb 212 experienced a power removal event when a user turned the toggle actuator 216 to the off position).

The light bulb 212 may query other lighting devices and/or the hub devices in one or more locations (e.g., rooms)

to determine if a power removal event was a system power removal event or a local power removal event. For example, if power removal events occurred within more than one room, the light bulb 212 may determine that the power removal event was a system power removal event. The light bulb 212 may query, on a periodic basis (e.g., every 10 seconds, 5 minutes, 1 hour, etc.) whether other lighting devices and/or the hub devices have experienced a power removal event. The light bulb 212 may query, aperiodically (e.g., based on a user action), whether the other lighting devices and/or the hub devices have experienced a power removal event. Also, or alternatively, the light bulb 212 may query the other lighting devices and/or the hub devices to determine if the other lighting devices and/or the hub devices have experienced a power removal upon the light bulb 212 regaining power after experiencing a power removal event.

The hub device 280 may comprise an additional source of power (e.g., an internal or external battery). The battery may provide power to the hub device 280 in the event that electrical power from an AC power source (such as AC power source 202, shown in FIG. 2) ceases to provide power. For example, the hub device 280 may receive electrical power from a battery if the hub device 280 experiences a power removal event (e.g., a system power removal event and/or a local power removal event). The hub device 280 may be configured to determine that it is not receiving power from the AC power source, but is being powered from the battery. If the hub device 280 experiences a power removal event and the hub device 280 begins receiving power from the battery, the hub device 280 may query control devices (e.g., lighting devices, such as the light bulb 212 and the light bulb 222) to determine if the power removal event to the hub device was a system power removal event or a local power removal event.

For example, after the hub device 280 experiences a power removal event and receives power from a battery, the hub device 280 may query the light bulb 212 to determine if light bulb 212 has experienced a power removal event. The hub device 280 may query the light bulb 212 to determine whether the light bulb experienced a power removal event at the same time as the hub device 280. If the light bulb 212 experienced a power removal event, and/or if the light bulb 212 experienced the power removal event at the same time as the hub device, the hub device 280 may determine that the power removal event was a system power removal event. If the light bulb 212 did not experience a power removal event, and/or if the light bulb 212 experienced a power removal event at a different time than the hub device 280, the hub device 280 may determine that the power removal event of the hub device was a local power removal event. The hub device may query one or more other control devices (e.g., the light bulb 222) to determine if the power removal event experienced by the hub device was a system power removal event or a local power removal event.

Figure 2B:
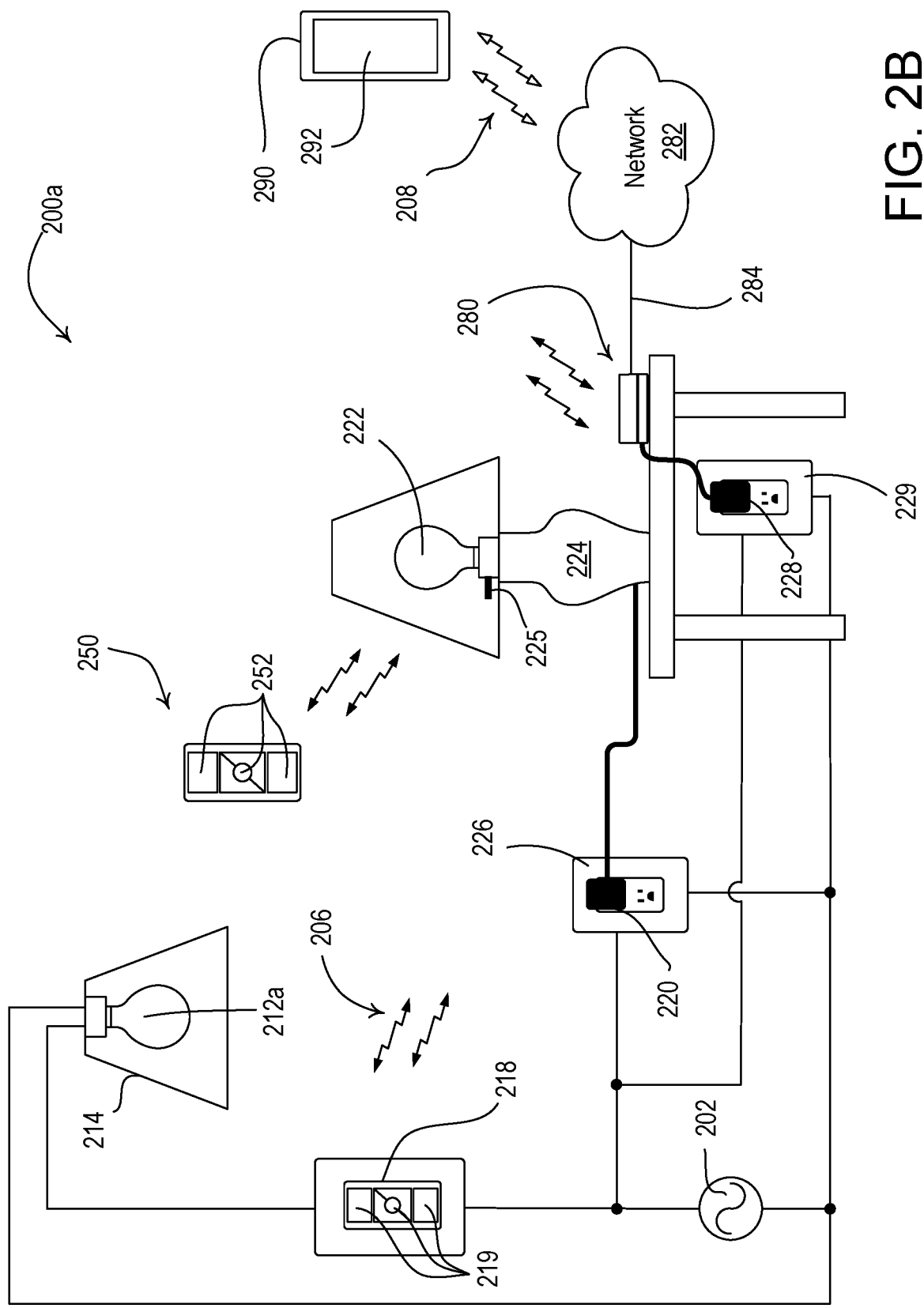

FIG. 2B shows a load control system 200a having a wall-mounted load control device (e.g., a dimmer device 218) for controlling the amount of power delivered to a lighting device, such as a light bulb 212a (e.g., a lighting load). As shown in FIG. 2B, the light bulb 212a may comprise a standard, dimmable light bulb (e.g., a light bulb that is not responsive to wireless signals). The dimmer device 218 may be configured to control the amount of power delivered to the light bulb 212a using a phase-control dimming technique. The dimmer device 218 may include actuators, such as buttons 219. The dimmer device 218 may be configured to control the power delivered to the light bulb 212a in response to actuation of buttons 219. The dimmer device 218 may be configured to receive digital messages via wireless signals, e.g., radio-frequency (RF) signals 206 (e.g., ZIGBEE®; NFC; BLUETOOTH®; WI-FI®; or a proprietary communication channel, such as CLEAR CONNECT™, etc.). Examples of wall-mounted dimmer devices are described in greater detail in U.S. Pat. No. 5,248,919, issued Sep. 28, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The dimmer device 218 may be configured to control the power delivered from the AC power source 202 to the light bulb 212a to control the intensity level of the light bulb 212a. The dimmer device 218 may retain the power state of the light bulb 212a. The dimmer device 218 may be configured to retain the power state of the light bulb 212a to an on power state. For example, dimmer device 218 may be configured to retain an intensity level of the light bulb 212a to a non-zero value (e.g., an intensity level of 1%-100%). The dimmer device 218 may retain the power state of the light bulb 212a to an on power state, for example, by physically maintaining electrical continuity of the circuit (e.g., AC circuit) between AC power source 202 and the light bulb 212a. The dimmer device 218 may receive the power from the AC power source 202 and prevent the power from being sent to the light bulb 212a to turn the light bulb 212a to the off power state. The dimmer device 218 may, however, store a time at which the power is received 202 and/or lost from the AC power source 202. The dimmer device 218 may identify when a power outage is a system power outage, as the dimmer device 218 may receive power so long as the AC power source 202 is providing power. Because the dimmer device 218 may receive power so long as the AC power source 202 is providing power (e.g., the dimmer device 218 is not downstream of a switch, such as wall-mounted load control device 210), the dimmer device 218 may be considered to be an unswitched electrical device. The load control system 200a may also comprise the light bulb 212, as shown in FIG. 2A, that receives power from the AC power source 202 via the wall-mounted load control device 210 and is responsive to the RF signals 206.

Referring again to FIG. 2B, as the dimmer device 218 may receive power from the AC power source 202 so long as the AC power source 202 is providing power, the light bulbs 212a, 222 and/or the hub device 280 may query the dimmer device 218 to determine whether a power removal event was a local power removal event or a system power removal event. Because the dimmer device 218 may receive power from the AC power source 202 so long as the AC power source 202 is providing power, it may be more reliable for light bulbs 212a, 222 and/or the hub device 280 to query the dimmer device 218 to determine the type of power removal event than querying other devices (e.g., light bulbs 212a, 222 and/or hub device 280), which may be unplugged from the power source and/or turned off by a light switch. The dimmer device 218 may be an indicator that the power removal event was a system power removal event. If there are multiple dimmer devices in the load control system 200, each of the dimmer devices losing power may indicate a system power removal event, while some or none of the dimmer devices losing power may indicate a local power removal event. The indication of the dimmer devices losing power may be used in combination to with other devices (e.g., the light bulbs 212a, 222, the hub device 280, etc.) to determine whether a power removal event was a local power removal event or a system power removal event.

The dimmer device 218 may not experience a local power removal event. For example, because the dimmer device 218 does not receive power from the AC power source 202 through a switch (e.g., the wall-mounted load control device 210), the dimmer device 218 may not be turned off by a user. A dimmer device 218 may experience a system power removal event. For example, a dimmer device 218 may experience a blackout. Because the dimmer device 218 may not experience a local power removal event, a power removal event experienced by the dimmer device 218 may be determined to be a system power removal event. The hub device 280 and/or lighting devices (e.g., the light bulb 212a and the light bulb 222) may determine that the power removal event experienced by the dimmer device 218 is a system power removal event.

As another example, the light bulb 222 may experience a power removal event. The light bulb 222 receives electrical power from electrical receptacle 226, which is not coupled to dimmer device 218. Because the light bulb 222 is not coupled to dimmer device 218, the power removal event to the light bulb 222 may be determined to be a local power removal event (e.g., in response to an actuation of the actuator 225 of the table lamp 224) and/or the power removal event to the light bulb 222 may be determined to be a system power removal event. To determine whether a power removal event is a local power removal event or a system power removal event, the power states of one or more lighting devices, dimmer devices, and/or hub devices may be determined. For example, if the light bulb 222 is experiencing a power removal event and the dimmer device 218 is experiencing a power removal event, it may be determined that the power removal event is a system power removal event. If the light bulb 222 is experiencing a power removal event and the dimmer devices positioned within one or more rooms are experiencing a power removal event, it may be determined that the power removal event is a system power removal event. If the light bulb 222 is experiencing a power removal event and the dimmer device 218 is not experiencing a power removal event, and vice-versa, it may be determined that the power removal event is a local power removal event. The lighting devices and/or the hub device 280 may determine the power states of one or more lighting devices.

After the lighting devices and/or other devices (e.g., the hub device 280) determine that the power removal event is a system power removal event, the power states of the lighting devices may be adjusted upon the power removal event ending. For example, upon the power removal event ending, the lighting devices and/or other the hub device 280 may adjust the power state of the lighting devices to prior power states of the lighting devices (e.g., power states prior to the power removal event). For example, after the lighting devices and/or the hub device 280 determine that the power removal event is a system power removal event, the lighting devices and/or the hub device 280 may obtain the prior power states of the lighting devices (e.g., via memory of the lighting devices, memory of the hub device 280, memory of the network device 290, memory of an external server, etc.). The lighting devices and/or the hub device 280 may send and/or set the power states of the lighting devices to the obtained prior power states of the lighting devices.

Figure 2C:
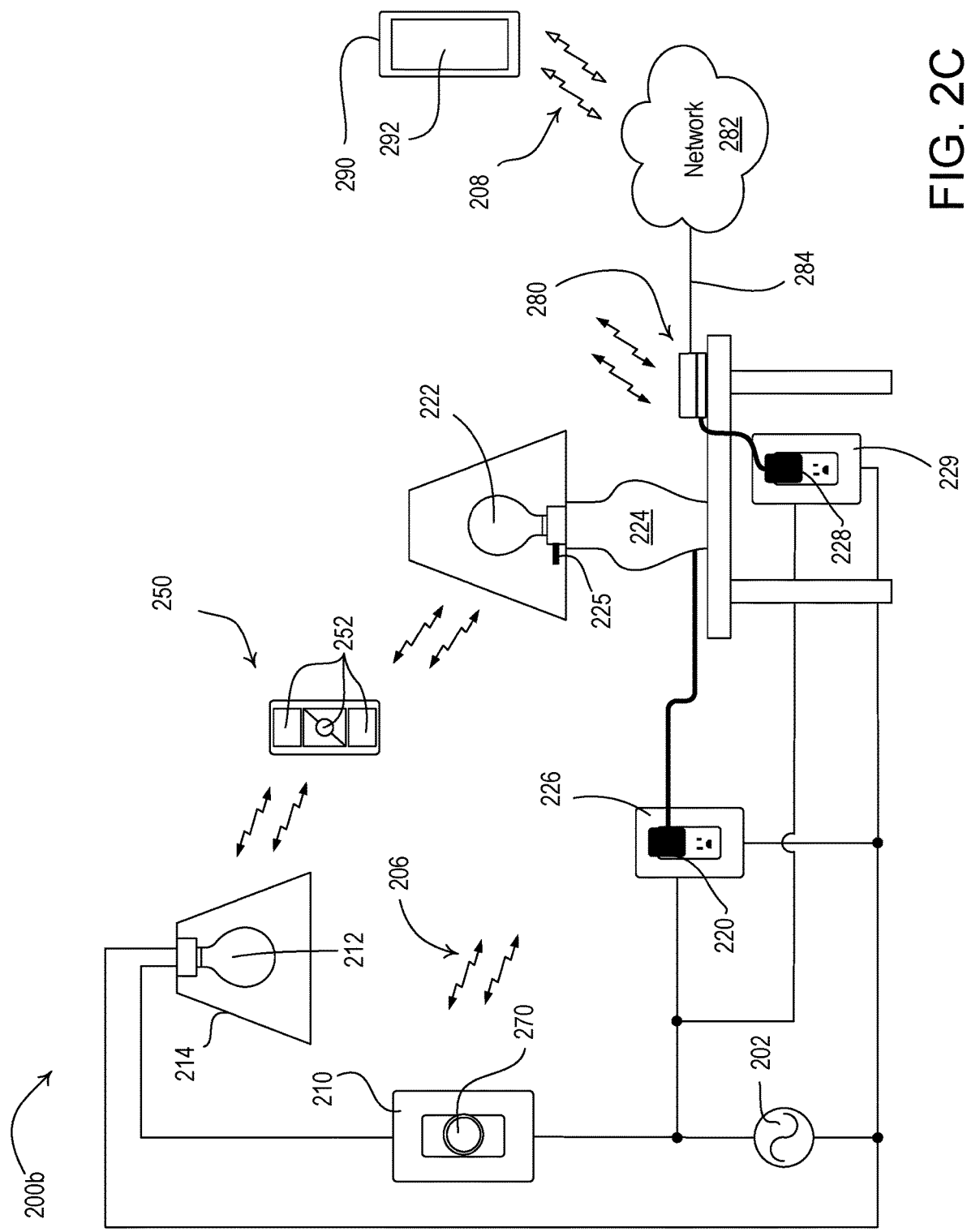

FIG. 2C shows a load control system 200b having a remote control device 270 that may be mounted over a toggle actuator of the wall-mounted load control device 210 (e.g., such as the toggle actuator 216 shown in FIG. 2A). The lighting devices (e.g., the light bulbs 212, 222) may be turned on or off, or adjust the intensity level, in response to digital messages transmitted by the remote control device 270 via the RF signals 206 (e.g., state change events). For example, the light bulbs 212, 222 may be turned on or off by rotating (e.g., turning) a rotation portion of the remote control device 270, or pressing an actuation portion of the remote control device 270. The intensity levels of the light bulbs 212, 222 may be increased or decreased by rotating the rotation portion of the remote control device 270 in one direction or another, respectively.

The remote control device 270 may be a retrofit remote control device capable of being mounted over the toggle actuator 216 of the wall-mounted load control device 210. The remote control device 270 may be coupled to the toggle actuator 216 to retain a power state of the lighting devices controlled by the wall-mounted load control device 210. For example, the remote control device 270 may be configured to maintain the switch installed on the wall-mounted load control device 210 in the "on" position (e.g., by covering the switch when in the "on" position) to maintain the flow of power from the AC power source 202 to the lighting bulb 212. Because the remote control device 270 may be configured to maintain the switch installed on the wall-mounted load control device 210 in the "on" position (e.g., the light bulb 212 is not downstream of a switch that is able to be controlled to an "off" position), the light bulb 212 downstream of the wall-mounted load control device 210 with the remote control device 270 mounted thereto may be considered to be an unswitched electrical device. The remote control device 270 may be configured to attach to the toggle actuator 216 and hold toggle actuator 216 in the "on" position. Because the toggle actuator 216 is maintained in an "on" position, the light bulb 212 may be held in an on power state.

The remote control device 270 may communicate with other devices (e.g., the light bulbs 212, 222, the network device 290, and/or the hub device 280) to transition the power states of light bulbs 212, 222 (e.g., state change events). For example, the remote control device 270 may communicate digital messages via the RF signals 206 with the light bulbs 212, 222 and/or the hub device 280 to transition the power states of the light bulbs 212, 222. The remote control device 270 may transmit digital messages including a move-to-level command that identifies a lighting level to which the lighting devices may change. The move-to-level command may indicate an "on" event or an "off" event to turn the light bulbs 212, 222 on or off, respectively. For example, the "on" event may be indicated with a 100% lighting level, or another defined lighting level. The "off" event may be indicated with a 0% dimming level. The lighting level for the "on" event and/or the "off" event may also, or alternatively, be stored at the light bulbs 212, 222 and the light bulbs 212, 222 may change to the lighting level upon receiving an indication of the occurrence of the "on" event or "off" event from the remote control device 270. The digital messages may indicate an "on" event when the remote control device 270 is rotated a predefined distance in one direction. The digital messages may indicate an "off" event when the remote control device 270 is rotated a predefined distance in the opposite direction. The digital messages may indicate an "on" event or an "off" event when the remote control device 270 is pressed (e.g., when a button on the face of the remote control device is pressed or the remote control device 270 is pressed in).

The remote control device 270 may transmit digital messages configured to increase the lighting level of the light bulbs 212, 222 when the remote control device 270 is rotated in one direction. The remote control device 270 may transmit digital messages configured to decrease the lighting level of the light bulbs 212, 222 when the remote control device 270 is rotated in the opposite direction. The digital messages may include a move-with-rate command, which may cause the light bulbs 212, 222 to change their respective intensity level by a predefined amount. The move-with-rate command may cause the light bulbs 212, 222 to retain their proportional intensity levels, and/or difference in respective intensity levels. The remote control device 270 may send digital messages to increase or decrease the lighting level by a predefined amount when rotated a predefined distance. The amount of the increase or decrease may be indicated in the digital messages or may be predefined at the light bulbs 212, 222.

The lighting devices (e.g., the light bulbs 212, 222) and/or the hub device 280 may be associated with the remote control device 270. The unique identifier (e.g., the serial number) of the remote control device 270 may be stored at the associated devices for recognizing digital messages therefrom for operating according to instructions in the digital messages.

A lighting device associated with a remote control device that is configured to be mounted overtop of an actuator of a light switch (e.g., the remote control device 270 that is mounted over the toggle actuator 216 of the wall-mounted load control device 210) may be assumed to be incapable of experiencing a local power removal event. For example, the light bulb 212 may be associated with the remote control device 270 for performing load control. The lighting bulb 212 may be assumed to be incapable of experiencing a local power removal event since the remote control device 270 retains the power state of the light bulb 212 in an on power state. Even when the remote control device 270 is actuated to change the light bulb 212 to the off power state, power may still be provided from the AC power source 202 to the light bulb 212 through the wall-mounted load control device 210, which is maintained in the on position.

The light bulb 212 that is receiving power from the AC power source 202 through the wall-mounted load control device 210 having the remote control device 270 may experience a system power removal event. For example, the light bulb 212 may experience a blackout. As the remote control device 270 may prevent the light bulb 212 from experiencing a local power removal event, a power removal event experienced by the light bulb 212 coupled to the remote control device 270 may be determined to be a system power removal event. The light bulb 212 may determine that the power removal event experienced by the light bulb 212 is a system power removal event since the light bulb 212 is associated with the remote control device 270. The hub device 280 may store the association of the light bulb 212 with the remote control device 270 and may determine that the power removal event experienced by the light bulb 212 is a system power removal event since the light bulb 212 is associated with the remote control device 270. The light bulb 212 and/or the hub device 280 may control the state of the light bulb 212 based on the determination.

Before being associated with a remote control device (e.g., the battery-powered remote control device 250 and/or the remote control device 270), the light bulb 212 may be configured to operate in an operation mode. The operation mode may be a switched mode (e.g., have stored in memory that the light bulb 212 should operate in the switched mode). When operating in the switched mode, the light bulb 212 may assume that each power removal event is a local power removal event and rely on the hub device 280 and/or other lighting devices to determine if the power removal event was a system power removal event. If the light bulb 212 is associated with the battery-powered remote control device 250 (e.g., that is not configured to be mounted over the toggle actuator 216 of the wall-mounted load control device 210), the light bulb 212 may be configured to continue operating in the switched mode. If the light bulb 212 is associated with at least one remote control device that is configured to be mounted over the toggle actuator 216 of the wall-mounted load control device 210 (e.g., the remote control device 270), the light bulb 212 may be configured to assume that the light bulb 212 is coupled downstream of a switch that is not able to be controlled to the off position. The unique identifier and/or a device type identifier of the battery-powered remote control device 250 and/or the remote control device 270 may be stored in memory to indicate the operation mode. The operation mode may be explicitly indicated in memory based on the association with the battery-powered remote control device 250 and/or the remote control device 270. The light bulb 212 may store in memory that the light bulb 212 should operate in another operation mode, such as an unswitched mode, during which the light bulb 212 may assume that each power removal event is a system power removal event.

The light bulb 222 may experience a power removal event. The light bulb 222 may receive electrical power from the electrical receptacle 226 and/or the light bulb 222 may be controlled by another switch or from an AC power source other than the light bulb 212. The light bulb 222 may be unassociated with the remote control device 270. As the light bulb 222 is unassociated with remote control device 270, the power removal event to the light bulb 222 may be determined to be a local power removal event (e.g., in response to an actuation of the actuator 225 of the table lamp 224) or a system power removal event. To determine whether a power removal event is a local power removal event or a system power removal event, the power states of one or more lighting devices and/or the hub device 280 may be determined. For example, if the light bulb 222 is experiencing a power removal event and light bulb 212 is experiencing a power removal event, it may be determined that the power removal event is a system power removal event. The light bulb 222 may receive an indication from the light bulb 212 that the light bulb 212 is in an unswitched mode or associated with the remote control device 280 and use this indication to determine that the power removal event that was also experienced by the light bulb 212 was a system power removal event. If the light bulb 222 is experiencing a power removal event and lighting devices positioned within other rooms are experiencing a power removal event, it may be determined that the power removal event is a system power removal event. If the light bulb 222 is experiencing a power removal event and light bulb 212 is not experiencing a power removal event, it may be determined that the power removal event is a local power removal event.

Upon the lighting devices and/or the hub device 280 determining that the power removal event is a system power removal event, the power state of the lighting devices may be adjusted after the power removal event has ended. For example, after the power removal event has ended, the lighting devices and/or the hub device 280 may adjust the power state of the lighting devices to the prior power states of the lighting devices. For example, upon the lighting devices and/or the hub device 280 determining that the power removal event is a system power removal event, the lighting devices and/or the hub device 280 may obtain the prior power states of the lighting devices (e.g., via the memory of the lighting devices, the memory of the hub device 280, the memory of the network device 290, memory of an external server, etc.). The lighting devices and/or the hub device 280 may send and/or set the power states of the lighting devices to the obtained prior power states of the lighting devices.

The remote control device 270 may include an internal sensing circuit capable of detecting a state change event of a lighting device (e.g., the light bulb 212), which may be caused by, for example, a power removal event (e.g., a system power removal event) or other control event (e.g., a command received by the light bulb 212 from the remote control device 150). During a power removal event, the remote control device 270 may also be capable of detecting, in response to the internal sensing circuit, when power has been removed (e.g., in response to detecting when a light bulb turns from on to off) and when power has been restored (e.g., in response to detecting when a light bulb turns from off to on). The remote control device 270 may be battery-powered. If, for example, the remote control device 270 is battery-powered, the remote control device 270 may be powered (e.g., may still be powered) during a system power removal event and may be able to detect the system power removal event. For example, when the remote control device 270 is mounted over the wall-mounted load control device 210 that supplies power to the light bulb 212, power may not be removed from the light bulb as a result of a local power removal event. If the light bulb 212 is not controlled by another control devices and the remote control device 270 detects a state change event (e.g., via the internal sensing circuit), the remote control device determine that a system power removal event occurred. Also, or alternatively, the light bulb 212 may be controlled by another control device (e.g., such as the remote control device 250). If the light bulb 212 is also controlled by the remote control device 250, the remote control device 270 may communicate with the light bulb 212 to determine whether the state change (e.g., from on to off) was triggered by the remote control device 250. If the internal sensing circuit detects a state change event that is not triggered by a command received from another control device (e.g., such as the remote control device 270), the remote control device determine that a system power removal event occurred.

For example, the internal sensing circuit may include a photosensing circuit (e.g., a photosensor) capable of measuring the amount of and/or detecting the presence and/or absence of light within the area in which the remote control device 270 is located (e.g., light emission). The remote control device 270 may comprise a lens for directing the light in the area to the photosensing circuit. The remote control device 270 may be situated proximate and/or oriented to allow the photosensing circuit to measure light emitted by to a lighting device (e.g., the light bulb 212). The remote control device 270 may be configured to detect a state change event and/or a system power removal event in response to detecting a positive change in the measured light level (e.g., in response to the light bulb 212 turning from off to on) or a negative change in the measure light level (e.g., in response to the light bulb 212 turning on to off) via the photosensing circuit. During a power removal event, the remote control device 270 may use the photosensing circuit to detect when power has been removed (e.g., in response to detecting a positive change in the measured light level) and when power has been restored (e.g., in response to detecting a negative change in the measured light level).

The internal sensing circuit may also include a line power sensing circuit (e.g., a mains voltage sensing circuit and/or a mains current sensing circuit). The line power sensing circuit may be capable of detecting a change (e.g., a decrease and/or increase) in the mains voltage and/or mains current (e.g., load current) being supplied to the lighting device (e.g., the light bulb 212). For example, the line power sensing circuit may detect when current begins to flow and/or stops flowing through the wall-mounted load control device 210 and/or the electrical wiring connected to the lighting device (e.g., via a Hall effect sensor). For example, the light bulb 212 may include a capacitor, which may conduct a large inrush current (e.g., a spike of current) when the light bulb 212 is turned on. These spikes in current may generate a magnetic field. The magnetic field may be detectable by the line power sensing circuit. For example, the remote control device 270 may be configured to detect a state change event and/or a system power removal event in response to detecting a positive change in the magnitude of the mains current (e.g., in response to the light bulb 212 turning from off to on) or a negative change in the magnitude of the mains current (e.g., in response to the light bulb 212 turning on to off) via the line power sensing circuit. During a power removal event, the remote control device 270 may use the line power sensing circuit to detect when power has been removed (e.g., in response to detecting a positive change in the magnitude of the mains current) and when power has been restored (e.g., in response to detecting a negative change in the magnitude of the mains current).

As described herein, a lighting device (e.g., the light bulb 212) may be controlled by multiple devices. If the lighting device is controlled by multiple devices, the remote control device 270 may communicate with the lighting device to determine whether a state change event was caused by a power removal event (e.g., a system power removal event) or other control event (e.g., a command received from the remote control device 150). For example, upon detection of a state change event by the internal sensing circuit (e.g., the photosensing circuit or the line power sensing circuit), the remote control device 270 may transit one or more digital messages to determine whether the power removal event is a system power removal event or a state change event. For example, if the lighting device responds to the digital message while the lighting device is turned off (e.g., powered, but not illuminated), the remote control device 270 may determine that the power removal event is a state change event. A lighting device that is turned off and responding to digital messages, may have been turned off by another device (e.g., a local power removal event). If, however, the lighting device does not respond to the digital message, the remote control device 270 may determine that the power removal event is a system power removal event. In that case, once the lighting device turns back on, the remote control device 270 may transmit a command to control the lighting device to its last state (e.g., before the power outage).

If the power removal event is determined to be a system power removal event (e.g., the lighting device does not respond to a digital message from the remote control device 270), the remote control device 270 may determine a previous state of one or more of the lighting devices (e.g., the light bulbs 212, 222) and perform state correction on the lighting devices. For example, state correction may include setting one or more of the lighting devices (e.g., the light bulbs 212, 222) to its state prior to the system power removal event. State correction may be performed after the lighting device turns back on (e.g., when the system power removal ends). For example, the remote control device 270 may store the previous state of the lighting device and set the lighting device to the previous state after the lighting device turns back on.

Figure 2D:
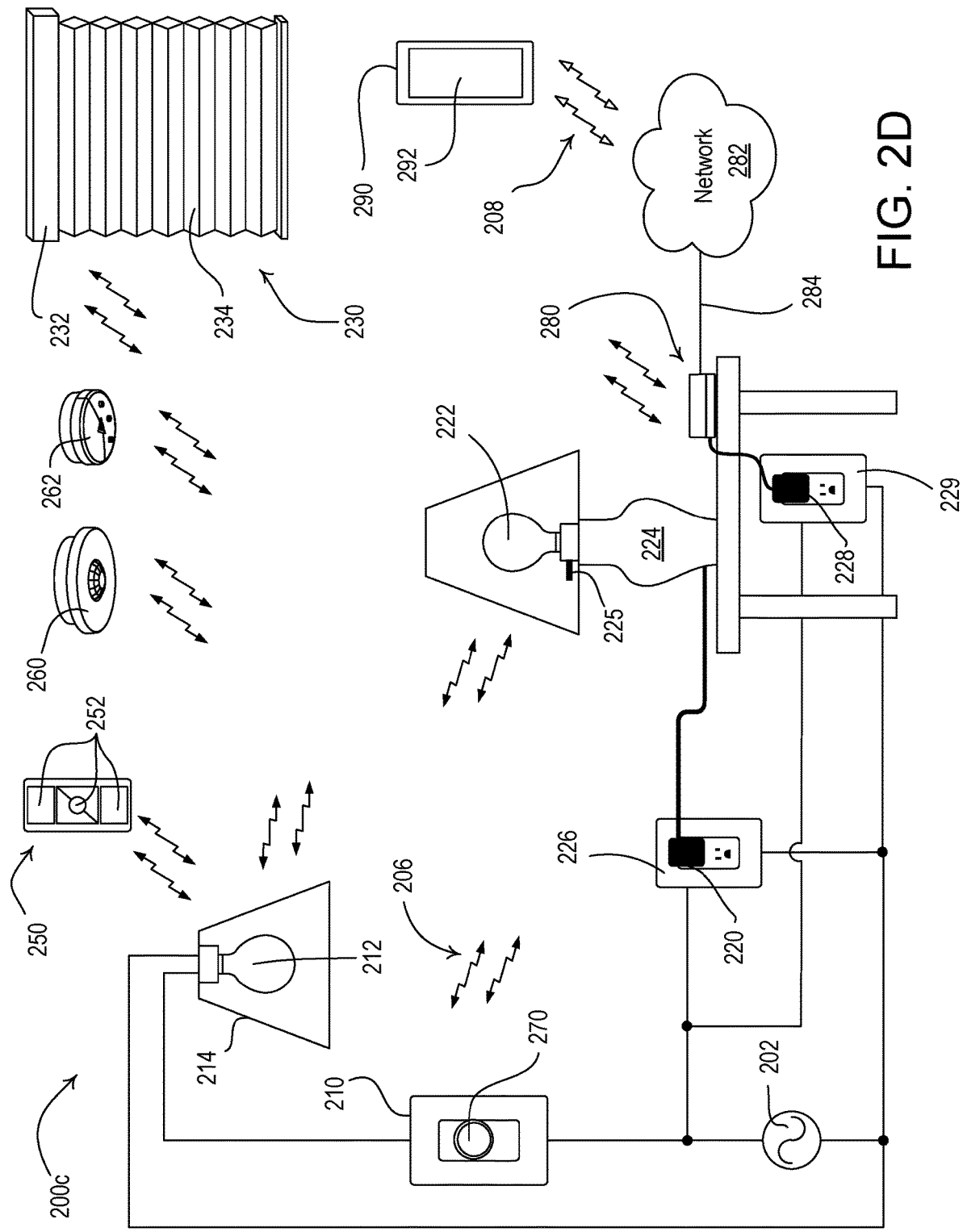

FIG. 2D shows a load control system 200c including additional control devices (e.g., input devices, load control devices, and/or controller devices). The load control system 200c may include other load control devices, which may operate similar to other load control devices described herein. Examples of other load control devices may include a daylight control device, e.g., a motorized window treatment 230, mounted in front of a window for controlling the amount of daylight entering the space in which the load control system 200c is installed. The motorized window treatment 230 may include, for example, a cellular shade, a roller shade, a drapery, a Roman shade, a Venetian blind, a Persian blind, a pleated blind, a tensioned roller shade systems, or other suitable motorized window covering. The motorized window treatment 230 may include a motor drive unit 232 for adjusting the position of a covering material 234 of the motorized window treatment in order to control the amount of daylight entering the space. The motor drive unit 232 of the motorized window treatment 230 may have an RF receiver and an antenna mounted on or extending from a motor drive unit of the motorized window treatment. The motor drive unit 232 of the motorized window treatment 230 may be battery-powered or may receive power from an external direct-current (DC) power supply. Examples of battery-powered motorized window treatments are described in greater detail in commonly-assigned U.S. Patent Application Publication No. 2012/0261078, published Oct. 18, 2012, entitled MOTORIZED WINDOW TREATMENT, and U.S. Patent Application Publication No. 2014/0231032, published Aug. 21, 2014, entitled BATTERY-POWERED ROLLER SHADE SYSTEM, the entire disclosures of which are hereby incorporated by reference The load control system may include other input devices that may operate similar to the input devices described herein. For example, the load control system 200c may include an occupancy sensor 260. The occupancy sensor 260 may be configured to detect occupancy and vacancy conditions in the space in which the load control system 200c is installed. The occupancy sensor 260 may transmit digital messages to the wall-mounted load control device 210 via the RF signals 206 in response to detecting the occupancy or vacancy conditions. The wall-mounted load control device 210 may be configured to turn on the light bulb 212 in response to receiving an occupied command. The wall-mounted load control device 210 may be configured to turn off the respective light bulb in response to receiving a vacant command. The occupancy sensor 260 may operate as a vacancy sensor to turn off (e.g., only turn off) the lighting devices in response to detecting a vacancy condition (e.g., to not turn on the light bulb 212 in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The load control system 200c may include a daylight sensor 262. The daylight sensor 262 may be configured to measure a total light intensity in the space in which the load control system is installed. For example, the daylight sensor may include an internal photosensing circuit capable of detecting changes in measurements of a total light intensity in the space. For example, the daylight sensor may detect the changes in the measurements of the total light intensity caused by the light bulbs 212, 222. The daylight sensor 262 may transmit digital messages including the measured light intensity to the wall-mounted load control device 210. The daylight sensor 262 may transmit digital messages via the RF signals 206 for controlling the intensities of the light bulb 212 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control devices (e.g., the lightbulbs 212, 222, the motorized window treatment 230, etc.) may be two-way communication devices and may receive the power removal event message and/or power state message. For example, load control devices may receive messages (e.g., power removal event messages and/or power state messages), and/or may acknowledge receipt of the messages (e.g., power removal event messages and/or power state messages) to the transmitting device. The load control devices may identify the power removal event message and/or power state message as being from the hub device 280, a lighting device, and/or the network device 290. The load control devices may identify the hub device 280, a lighting device, and/or a network device 290 by a device identifier (unique identifier).

The input devices (e.g., the occupancy sensor 260, daylight sensor 262, remote control device 250, remote control device 270 etc.) may be one-way or two-way communication devices. The input devices that are two-way communication devices may receive the power removal event message and/or power state message. The input devices that are one-way communication devices may be unable to receive the power removal event message and/or the power state message. The one-way communication devices may transmit power state information and/or power removal event information. The power state information and/or the power removal event information may include the identifier of the transmitting device. To transmit the power state information and/or power removal event information, a button on the one-way communication device may be actuated or the device may identify a power startup at the device. To trigger the transmission of power state information and/or power removal event information at the daylight sensor 262, the daylight sensor may detect a changes in the measured light level. The daylight sensor 262 may be a sensor that is external to other devices in the system (e.g., remote control device 270, hub device 280 and/or other devices in the system) and capable of measuring light levels in the space. Though some control devices may be described as one-way or two-way communication devices, any control device may include a button and/or sensing circuit for triggering the transmission of power state information and/or power removal event information.

The control devices (e.g., lighting devices, the battery-powered remote control device 250, the occupancy sensor 260, the daylight sensor 262, the remote control device 270, the hub device 280, and/or the network device 290, etc.) may communicate with one another via one or more communication protocols. For example, the lighting devices, the battery-powered remote control device 250, the occupancy sensor 260, the daylight sensor 262, and the remote control device 270 may be capable of communicating with the hub device 280 and/or the network device 290 via wireless signals (e.g., RF signals), such as WI-FI® signals; WIMAX® signals; BLUETOOTH® signals; near field communication (NFC) signals; proprietary communication signals, such as CLEAR CONNECT™; ZIGBEE® signals, Z-WAVE signals, and/or the like. Each control device may be capable of communicating on the same protocol and/or frequencies. Each control device may be capable of communicating on different protocols and/or frequencies. For example, the occupancy sensor 260 and/or the daylight sensor 262, and the motorized window treatment 230 may communicate via one protocol or frequency (e.g., a proprietary protocol, such as CLEAR CONNECT™), the remote control device 270, the battery-powered remote control device 250, and/or the light bulbs 212, 222 may communicate via one protocol or frequency (e.g., ZIGBEE®, BLUETOOTH, etc.), and/or the network device 290 may communicate via one protocol or frequency (e.g., WI-FI®, cellular, etc.). The occupancy sensor 260, the daylight sensor 262, and/or the motorized window treatment 230 may communicate using the same or different protocol or frequency as the remote control device 270, the battery-powered remote control device 250, and/or the light bulbs 212, 222. An intermediate device (e.g., the hub device 280) may be used to allow communication between one or more devices communicating using one or more communication protocols.

The remote control device 270 may be coupled to and/or mounted over the toggle actuator 216 of the wall-mounted load control device 210 (e.g., as described above). The load control devices (e.g., the light bulbs 212, 222, the motorized window treatment 230, etc.) may experience a power removal event. To determine whether a power removal event is a local power removal event or a system power removal event, the power states of one or more of the control devices and/or the hub device 280 may be determined. For example, if the light bulb 212 is experiencing a power removal event and one or more of the other control devices are experiencing a power removal event, it may be determined that the power removal event is a system power removal event. If control devices positioned within one or more rooms are experiencing a power removal event, it may be determined that the power removal event is a system power removal event. If the light bulb 212 is experiencing a power removal event and other control devices are not experiencing a power removal event, it may be determined that the power removal event is a local power removal event. The lighting devices and/or the hub device 280 may determine the power states of one or more control devices.

A power removal detection device may be configured to detect a state change event and determine whether the state change event is the result of system power removal event (e.g., power removal event detection). As described herein, a device configured to perform power removal event detection may be a power removal detection device. Power removal event detection may be performed by devices other than the remote control device 270. For example, power removal event detection may be performed by the hub device 280. For example, to determine if a power removal event is a system power removal event, the hub device 280 may include an internal sensing circuit, such as a line voltage sensing circuit, for determining if the mains voltage generated by the AC power source 202 is present. In addition, the hub device 280 may comprise a photosensing circuit capable of detecting a state change event of a lighting device (e.g., the light bulb 212), which may be caused by, for example, a power removal event (e.g., a system power removal event) or other control event (e.g., a command received by the light bulb 212 from the remote control device 150). In addition, the hub device 280 may receive messages from one or more of the input devices (e.g., the occupancy sensor 260, the daylight sensor 262, the remote control device 270, etc.) indicating a state change event of a lighting device (e.g., the light bulb 212).

The hub device 280 may be powered from the AC power source 202 (e.g., via the electrical plug 220 plugged into the electrical receptacle 226). In addition, the hub device 280 may include a power source other than from line voltage (e.g., so that if a system power removal event occurs, the hub device 280 may still be powered and/or functional). For example, the hub device 280 may include a battery backup, which may be used for power when a system power removal event occurs. Also, or alternatively, the hub device 280 may be solely powered by an alternative power source other than line voltage.

The hub device 280 may operate as a power removal event detection device and may be in communication with multiple input devices (e.g., the occupancy sensor 260, the daylight sensor 262, the remote control device 250, the remote control device 270 etc.) and/or multiple load control devices (e.g., the light bulbs 212, 222, the motorized window treatment 230, etc.). The hub device 280 may receive one or more messages indicating a state change event. The hub device 280 may be configured to determine whether the state change event is the result of a system power removal event or another control event (e.g., a command received by the light bulb 212 from the remote control device 150). For example, when the hub device 280 receives messages from multiple daylight sensors indicating that each of the multiple lighting devices have experienced a state change event (e.g., each of the lighting devices are unpowered), the hub device 280 may determine that a system power removal event has occurred. Also, or alternatively, the hub device 280 may use internal sensing circuit (e.g., a photosensing circuit or a line power sensing circuit) to determine whether a state change event is the result of a system power removal event or another control event. For example, as described herein, the hub device 280 may include an internal sensing circuit, such as a line voltage sensing circuit, for determining if the mains voltage generated by the AC power source 202 is present. When the hub device 280 determines that the power removal event is a system power removal event, the hub device 280 may perform state correction for the lighting devices (e.g., the light bulbs 212, 222).

Figure 3:
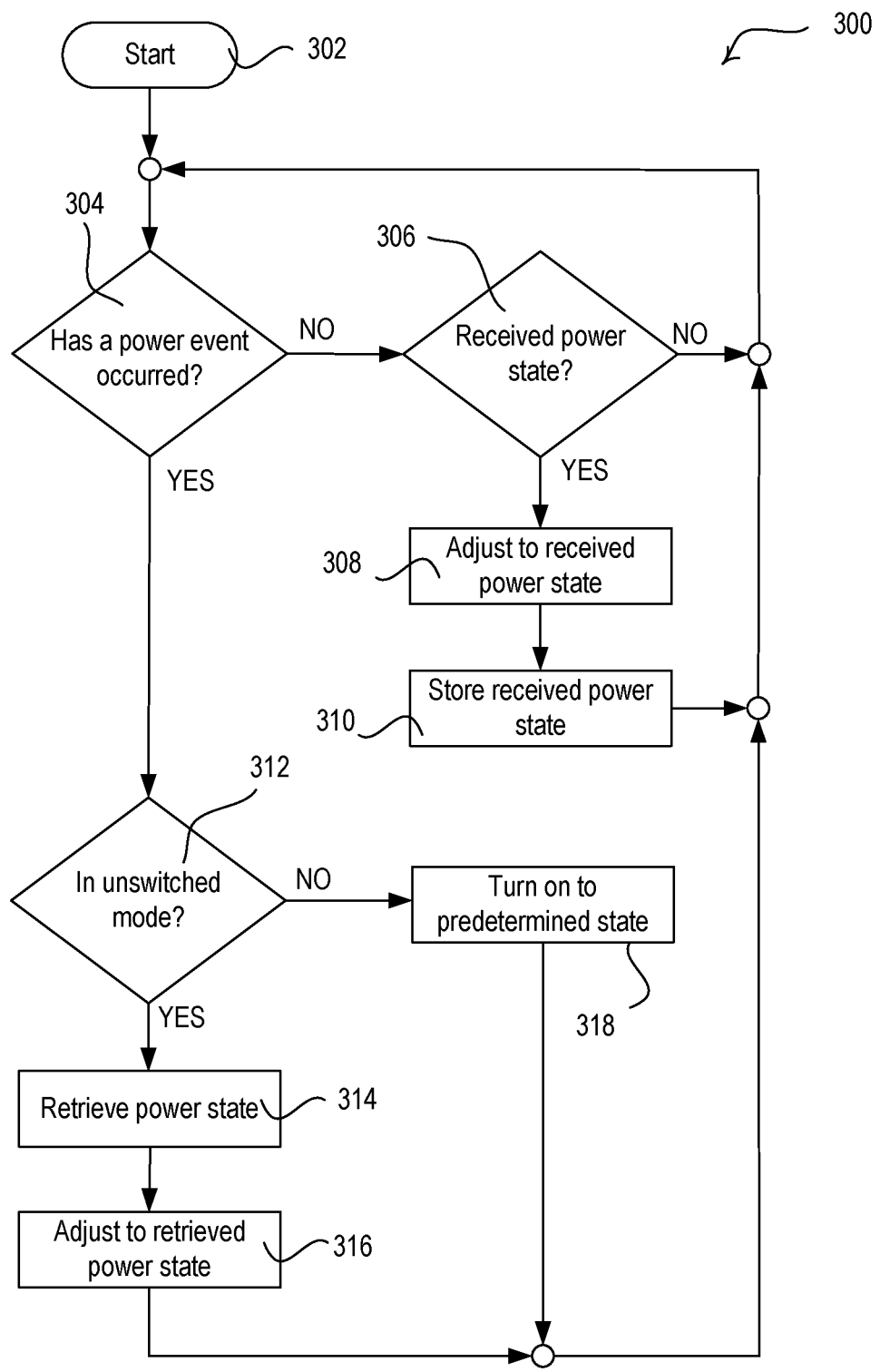
FIGS. 3-5 are simplified flowcharts of example methods for adjusting and/or retaining state information of control devices.

FIG. 3 is a simplified flowchart depicting an example method 300 for retaining and/or adjusting power state information for lighting devices (e.g., the light bulb 212 and/or the light bulb 222). The method 300 may depict an example method for retaining and/or adjusting power state information for lighting devices based on whether an operation mode (e.g., a switched mode) is set. As shown in FIG. 3, the method 300 may begin at 302. At 304, the lighting device and/or the hub device 280 may determine if the lighting device has encountered a power removal event. For example, the lighting device and/or the hub device 280 may determine if the lighting device has encountered a loss of power, such as blackout, a brownout, or another activity that has removed electrical power from the lighting device. The lighting device and/or the hub device 280 may determine information regarding the power removal event. For example, the lighting device and/or the hub device 280 may determine the time at which the power removal event occurred, the time at which power was last regained, the duration of the power removal event, and/or the duration since the power removal event ended.

If the lighting device determines that a power removal event has not occurred, the method may move to 306. At 306, the lighting device may determine whether power state information has been received. The power state information may include an on power state, an off power state, an intensity state, a color state, etc. For example, at 306, the lighting device may determine whether the lighting device has received power state information of an intensity of sixty percent. The power state information may be received via one or more digital messages. For example, a lighting device may receive power state information from a control device, a network device, a hub device, etc.

If power state information is received at 306, the lighting device may adjust its state, at 308. The lighting device may adjust its state based on the received power state information. For example, a lighting device may set its state to an intensity of sixty percent if the device receives a digital message including a request for the lighting device to set its state to an intensity of sixty percent. The lighting device may, at 310, store the received power state information. The lighting device may store the power state internally (e.g., in memory of the lighting device). The lighting device may store the power state externally (e.g., on an external device, such as another lighting device, a hub device, an external server, etc.). The method may return to 304 to determine if a power removal event has occurred.

If at 304, it is determined that a power removal event has occurred (e.g., the lighting device and/or the hub device 280 determines that a power removal event has occurred), the lighting device and/or the hub device 280 may determine, at 312, whether an operation mode is set. For example, the lighting device and/or the hub device 280 may determine whether a switched mode is set and/or whether an unswitched mode is set. The switched mode may indicate that the lighting device is capable of being controlled by a switch (e.g., the toggle actuator 216 coupled to the wall-mounted load control device 210). The unswitched mode may indicate that the lighting device is incapable of being controlled (e.g., turned off and/or turned on) by a switch, such as toggle actuator 216. If, at 312, the control is not set to the unswitched mode, the lighting device and/or the hub device 280 may set the power state of the lighting device to a predetermined state (e.g., an on power state at a predetermined intensity state) at 318. For example, if the lighting device is not set to the unswitched mode, the lighting device and/or the hub device 280 may set the state of the lighting device to a full intensity level, a defined intensity state, and/or the prior power state. After setting the power state at 318, the method may return to 304 to determine if a power removal event has occurred.

If at 312, the unswitched mode is set, the method 300 may move to 314. At 314, the lighting device and/or the hub device 280 may retrieve a power state of the lighting device. The power state of the lighting device may be a prior power state of the lighting device (e.g., a power state prior to the power removal event). For example, if the lighting device and/or the hub device 280 determines that a power removal event has occurred, at 304, the lighting device and/or the hub device 280 may retrieve the power state that the lighting device and/or the hub device 280 previously and stored at 310. At 316, the lighting device may adjust its power state to the power state retrieved at 314. As an example, at 316, the lighting device may adjust its power state to an intensity of sixty percent if the prior power state was an intensity of sixty percent. After setting the power state at 316, the method may return to 304 to determine if a power removal event has occurred.

Figure 4:
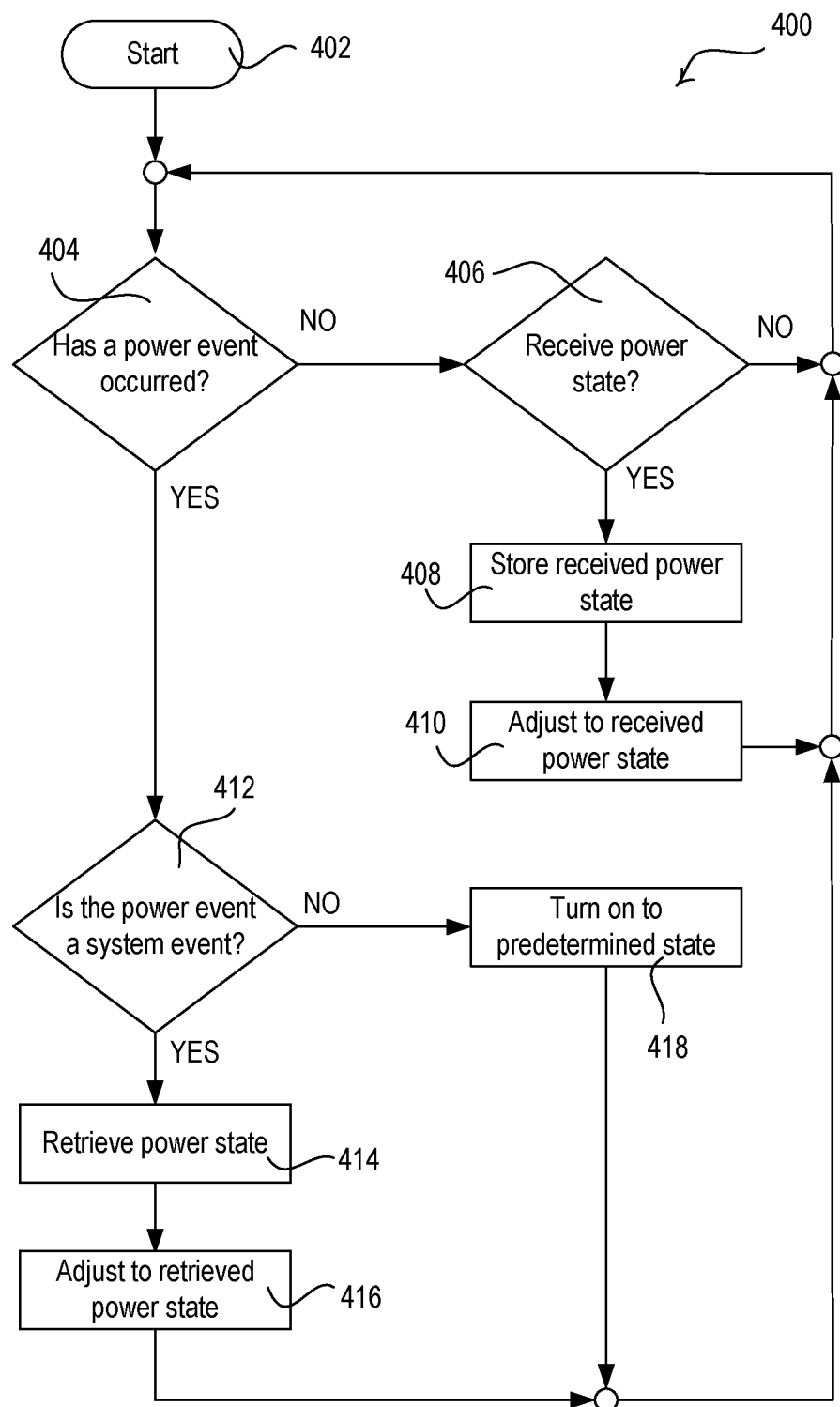

FIG. 4 is a simplified flowchart depicting an example method 400 for retaining and/or adjusting state information (e.g., power state information) of one or more lighting devices (e.g., the light bulb 212 and/or the light bulb 222). The method 400 may depict an example method for retaining and/or adjusting state information of one or more light devices, based on whether a power removal event is a local power removal event or a system power removal event. For example, method 400 may depict an example method for retaining and/or adjusting state information (e.g., power state information) of lighting devices using a hub device (such as the hub device 280). As shown in FIG. 4, the method 400 may begin at 402. At 404, the hub device may determine if the lighting device has encountered a power removal event. For example, the hub device may determine if the lighting device has encountered a blackout, a brown-out, or another activity (such as a user physically turning off a switch to a lighting load) that has removed electrical power from the lighting device. The hub device may determine information regarding the power removal event. For example, the hub device may determine the time at which the power removal event occurred, the duration of the power removal event, and/or the duration since the power removal event ended.

If the hub device determines that a power removal event has not occurred, the method may move to 406. At 406, it may be determined whether power state information is received. The power state information may include information relating to the power state of the hub device 280, and/or the power state information may include information relating to the power state of one or more lighting devices. The power state information may include an on power state, an off power state, an intensity state, a color state, etc. For example, at 406, the lighting device may determine whether the hub device and/or the lighting device has received power state information of an intensity of sixty percent. The power state information may be received via one or more digital messages. For example, a lighting device may receive power state information from a control device, a network device, a hub device, etc.

If power state information is received at 406, the received power state information may be stored at 408. The lighting device may store the power state internally (e.g., in memory of the lighting device). The power state may be stored externally (e.g., on an external device, such as another lighting device, a hub device, an external server, etc.).

If power state information is received at 406, the lighting device may adjust its power state at 410. The lighting device may adjust its power state based on the received power state information. For example, a lighting device may set its state to an on power state if the lighting device receives a digital message including a request for the lighting device to set its state to an on power state. If the power state information is not received at 406, or is received and the lighting device has performed adjustments, the method 400 may return to 404 to determine if a power removal event has occurred.

If at 404, it is determined that a power removal event has occurred (e.g., the hub device 280 determines that a power removal event has occurred), the hub device 280 may determine, at 412, whether the power removal event is a system power removal event, at 412. The hub device 280 may determine that a power removal event is a system power removal event (e.g., a brownout and/or a blackout) by querying lighting devices positioned at different locations and/or by querying lighting devices that are within groups positioned at different locations. For example, the hub device 280 may query lighting devices connected to different circuits (e.g., AC circuits) to determine if the power removal event is a system power removal event (e.g., a power removal event affecting more than one AC circuit, such as a brownout or blackout) and/or whether the power removal event is a local power removal event (e.g., a power removal event affecting a single AC circuit, such as when a user physically turns off a switch to a lighting device, for example).

If at 412, the power removal event is determined to not be a system power removal event, the lighting device may set the state of the control device to a predetermined state (e.g., an on power state at a predetermined intensity state), at 418. For example, if the power removal event is determined to not be a system power removal event, the lighting device may set the state of the lighting device to a full intensity level, a defined intensity state, and/or the prior power state. After setting the power state at 418, the method may return to 404 to determine if a power removal event has occurred If at 412, the power removal event is determined to be a system power removal event, move to 414. At 414, the lighting device may retrieve a power state of the lighting device. The power state of the lighting device may be a prior power state of the lighting device (e.g., a power state prior to the power removal event). For example, if the lighting device and/or the hub device 280 determines that a system power removal event has occurred, at 410, the lighting device and/or the hub device 280 may retrieve the power state that the lighting device previously stored at 410. At 416, the lighting device may adjust its power state to the power state retrieved at 414. As an example, at 416, the lighting device may adjust its power state to an intensity of sixty percent if the prior power state was an intensity of sixty percent. After setting the power state at 416, the method may return to 404 to determine if a power removal event has occurred.

Figure 5:
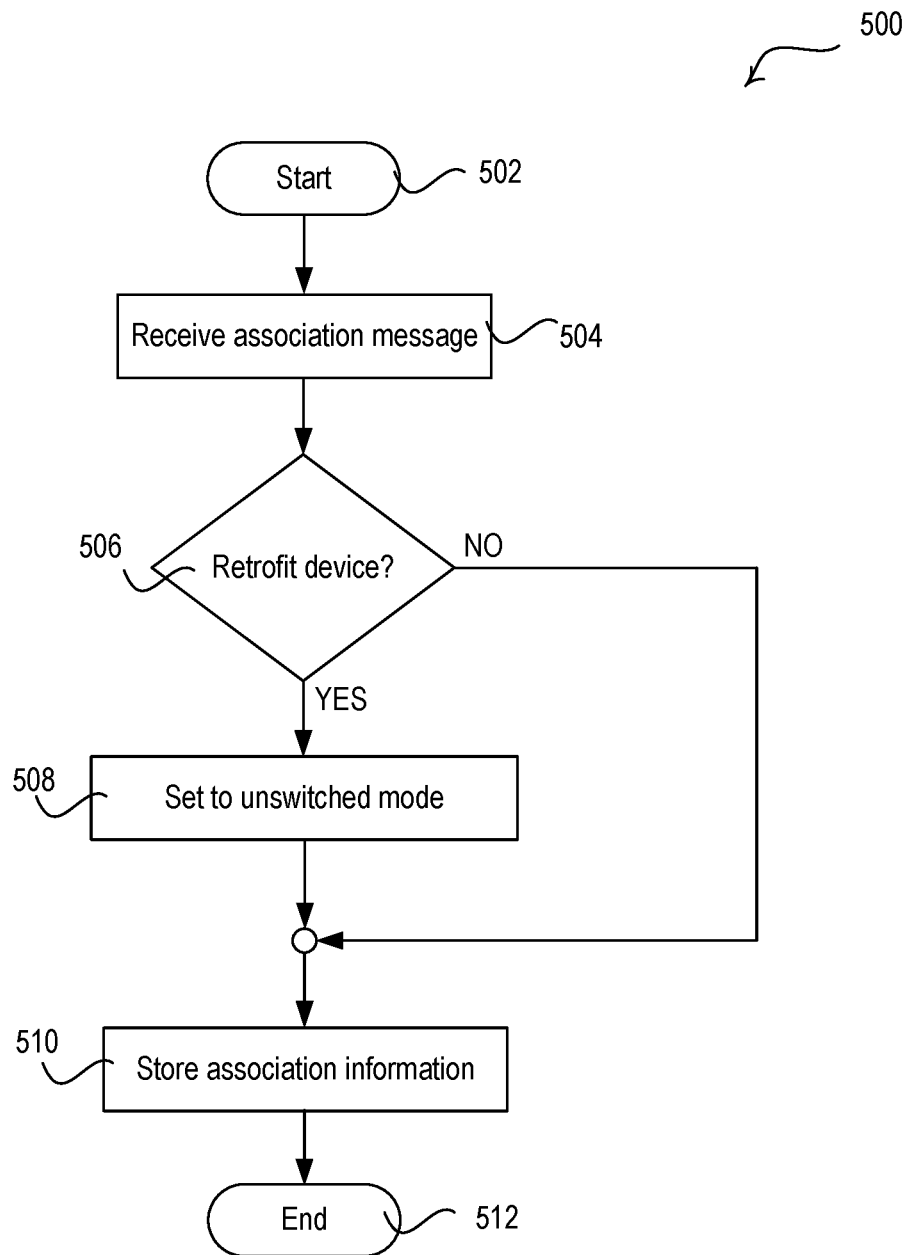

FIG. 5 is a simplified flowchart depicting an example method 500 for associating a lighting device (e.g., the light bulb 212 and/or the light bulb 222) with a retrofit remote control device (e.g., the retrofit remote control device 270). For example, the method 500 may be executing by the lighting device for determining whether state information (e.g., power state information) of one or more control devices is to be adjusted and/or retained, based on the use of the retrofit remote control device 270. The retrofit remote control device may be configured to be coupled to a toggle actuator of a light switch (e.g., the toggle actuator 216 of the wall-mounted load control device 210) that is coupled in series electrical connection with the lighting device. The retrofit remote control device may be configured to retain the light switch in an on position. The retrofit remote control device may communicate with the lighting device, for example, via one or more of the devices via wireless signals, e.g., radio-frequency (RF) signals 206 (e.g., ZIGBEE®; NFC; BLUETOOTH®; WI-FI®; or a proprietary communication channel, such as CLEAR CONNECT™, etc.).

As shown in FIG. 5, the method 500 may begin at 502. At 504, an association message may be received. For example, at 504, the lighting device may receive an association message. The association message may be sent by one or more devices. For example, the association message may be sent by control devices (e.g., lighting devices, remote control devices, etc.) and/or hub devices.

The association message may be transmitted from a device in an association mode. The association message may indicate a unique identifier of the device and/or a device type from which the association message is transmitted. For example, an association message from a lighting device may indicate that the message is from a lighting device, an association message from a wall-mounted dimmer may indicate that the message is from a wall-mounted dimmer, and/or an association message from a retrofit remote control device may indicate that the message is from a retrofit remote control device. The device type may be indicated by the unique identifier, or a separate identifier. The association message may indicate the location of the device in the load control system from which the association message is received. The association message may identify the devices that are coupled to and/or associated with the device from which the association message is sent. For example, a device may send association information, including the identification of devices and/or device types, stored on the device during association and from which the device may receive digital messages for performing control.

At 506, it may be determined if the association message was received from a retrofit remote control device. The association message may indicate the other control devices with which the retrofit device is associated. For example, if the lighting device receives an association message from a retrofit remote control device during an association mode, the lighting device may be associated with the retrofit device. The lighting device may also identify the retrofit remote control device as being previously associated with another lighting device from association information indicating previous associations. Based on the association information, the lighting device may determine the location of the retrofit remote control device and/or the other control devices (e.g., lighting devices) to which the retrofit remote control device is associated.

If at 506, it is determined that a retrofit device is not being used, the method 500 may move to 510. If, at 506, it is determined that a retrofit device is being used, an operation mode may be set at 508 (e.g., an unswitched mode may be set). The unswitched mode may indicate that the lighting device is incapable of being controlled (e.g., turned off and/or turned on) by a switch (e.g., the wall-mounted load control device 210 shown in FIG. 2). For example, the unswitched mode may indicate that the lighting device is not downstream of a light switch that is capable of being switched off at the time. The unswitched mode may indicate that the lighting device is downstream of a light switch to which a retrofit remote control device is mounted, where the retrofit remote control device may retain the light switch in the on position.

At 510, association information received in the association message at 504 may be stored. For example, at 510, a unique identifier (e.g., serial number) of the retrofit remote control device and/or the associated control devices (e.g., a lighting device, such as light bulb 212) may be stored. The association information may include the unique identifier (e.g., serial number) of other devices, the device types, locations, etc. of devices. The association information may be stored by the hub device 280, a lighting device, and/or the network device 290. The association information may be stored so that the hub device 280, the lighting devices, and/or the network device 290 may determine the control devices that are associated with a retrofit remote control device. The association information may be stored so that the hub device 280, the lighting devices, and/or the network device 290 may identify the control devices that are unassociated with a retrofit remote control device.

If a control device (e.g., lighting device) is associated with a retrofit remote control device, the control device may be determined to have experienced a system power removal event if the control device experiences a power removal event. For example, if the light bulb 212 is associated with the retrofit remote control device 270 and the light bulb 212 experiences a power removal event, it may be determined that the light bulb 212 has experienced a system power removal event. The light bulb 212 may be determined to have experienced a system power removal vent because the retrofit remote control device 270 is configured to maintain the toggle actuator 216 of the wall-mounted remote control device 210 in the on position and the power state of the light bulb 212 in the on power state. For example, if the retrofit remote control device 270 is configured to prevent a user from actuating the toggle actuator 216 in the on position and the wall-mounted remote control device from turning off the light bulb 212, the light bulb 212 may be turned to an off power state during a system power removal event (e.g., brownout, blackout, etc.). The light bulb 212 may be prevented from being turned off based on a local power removal event (e.g., turning the toggle actuator 216 to the off position). If the light bulb 212, other lighting devices, and/or the hub device 280 determines that the light bulb 212 has experienced a power removal event, the light bulb 212, the other lighting devices, and/or the hub device 280 may determine that the power removal event of the light bulb 212 is a system power removal event. The method may end at 512.

Figure 6:
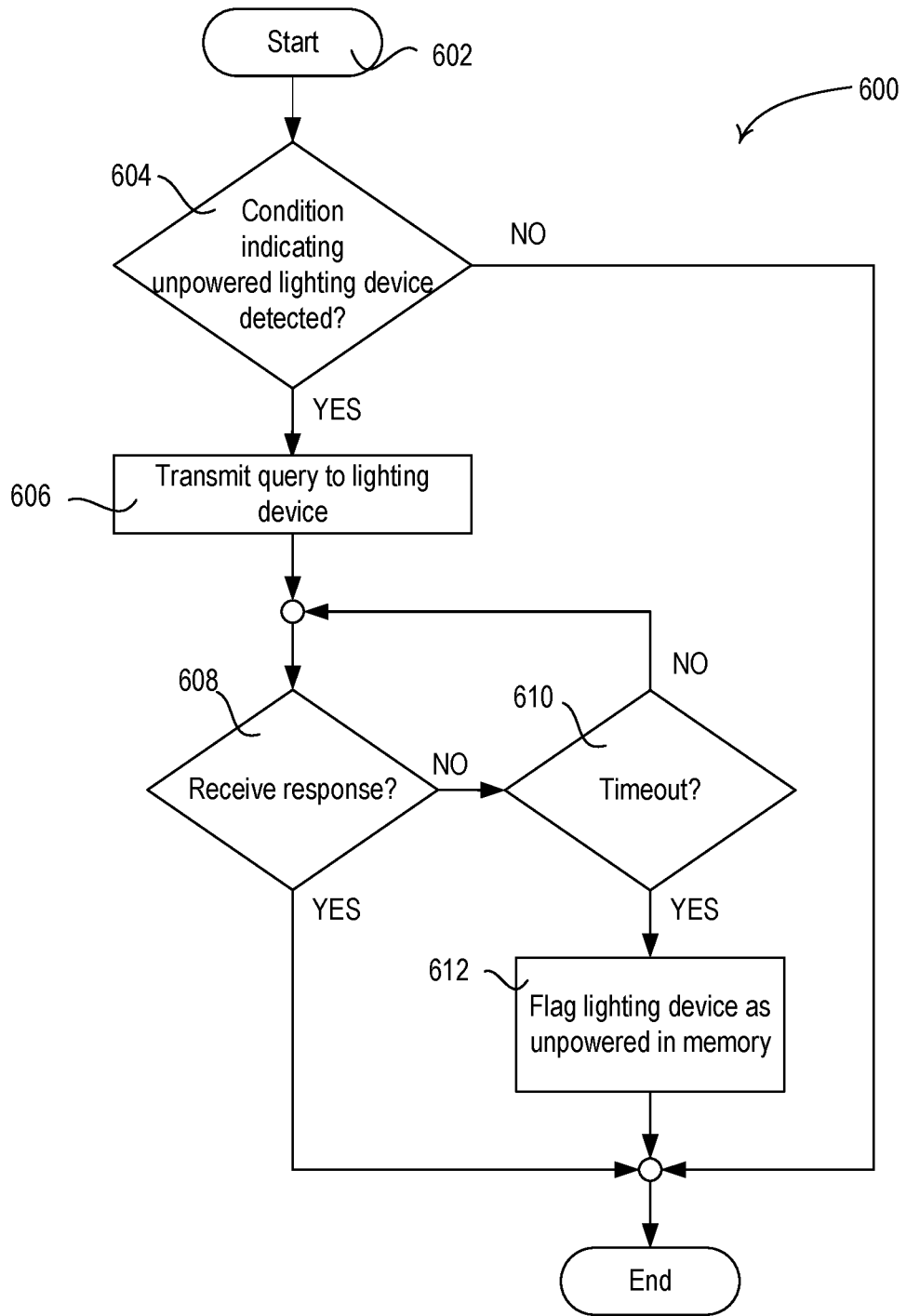
FIG. 6 is a simplified flowchart of an example method for detecting and flagging power removal events.

FIG. 6 is a simplified flowchart of an example procedure 600 for detecting and flagging power removal events (e.g., system power removal events). The procedure 600 may be performed by a control device, such as a remote control device (e.g., the remote control device 270) and/or a hub device (e.g., the hub device 280). Also, or alternatively, the procedure 600 may be performed in conjunction by both the remote control device and the hub device. For example, certain steps in the procedure 600 may be performed by the remote control device while other steps in the procedure 600 may be performed by the hub device.

The procedure 600 may begin at 602. At 604, the control device may detect a condition indicating that a lighting device (e.g., one or both of the light bulbs 212, 222) has changed states to turn from on to off (e.g., a state change event). As described herein, the control device may detect that the lighting device has changed from on to off via an internal sensing circuit (e.g., a photosensing circuit and/or a line power sensing circuit). For example, if the internal sensing circuit is a photosensing circuit, the control circuit may measure the light emitted by the lighting device via the photosensing circuit to detect a condition indicating that that the lighting device has changed states from on to off. If the internal sensing circuit is a line power sensing circuit, the control device may detect changes in the mains current conducting through the lighting device to detect a condition indicating that the lighting device has changed states from on to off Also, or alternatively, the control device may detect that the lighting device has changed states from on to off by receiving or more messages. For example, the control device may receive one or more messages that indicate the lighting device has experienced a state change event from one or more external input devices (e.g., the daylight sensor 262, the remote control device 250, the remote control device 270, etc.). As described herein, the messages may be received from multiple daylight sensors and/or may indicate that one or more lighting devices have changed states from on to off For example, when a daylight sensor detects that the lighting devices have changed states from on to off (e.g., a state change event), the daylight sensor may generate and/or transmit a message indicating that a state change event has occurred.

As described herein, multiple devices (e.g., the remote control device 270, the hub device 282, and/or the remote control device 250) may control the lighting device. Accordingly, the condition indicating the lighting device has changed states from on to off may be a result of the lighting device receiving control instruction to turn off from one of the multiple control devices, or a system power removal event. At 606, to determine whether the state change event is the result of a system power removal event or another control event, the control device may transmit a query to the lighting device. After transmitting the query at 608, the control device may receive a response from the lighting device at 608 or a timeout may expire at 610. Reception of a response from the lighting device may indicate that the change state event was caused by the lighting device receiving control instruction to turn off from one of the multiple control devices (e.g., a control event). For example, the lighting device may send a response if the lighting device is electrically powered even if the lighting device is turned to an off state. For example, the lighting device may be electrically powered but turned off in response to receiving control instructions from another remote control device. Alternatively, expiration of the timeout may indicate that the change state event was caused by a system power removal event. For example, if the control device does not receive a response from the lighting device within a certain amount of time (e.g., the timeout), the control device may determine that the lighting device is unpowered (e.g., a system power removal event occurred). If a timeout expires before a response to the query is received, the control device may flag the lighting device as unpowered in memory at 612. After either receiving a response to the query from the lighting device at 608 or flagging the lighting device as unpowered at 612, the procedure 600 may end.

As described herein, the procedure 600 may be used to detect state change events and/or determine whether the state change event was caused by a lighting device receiving control instruction to turn off from one of the multiple control devices (e.g., a control event) or a system power removal event. Detecting a system power removal event may allow a control device (e.g., remote control device 270 and/or hub device 280) to track and/or store the lighting devices that are experiencing a system power removal event. Further, tracking lighting devices that are experiencing system power removal events may allow the control device to perform state correction after the lighting device regains power (e.g., setting the lighting device to its state prior to the power removal event).

Figure 7:
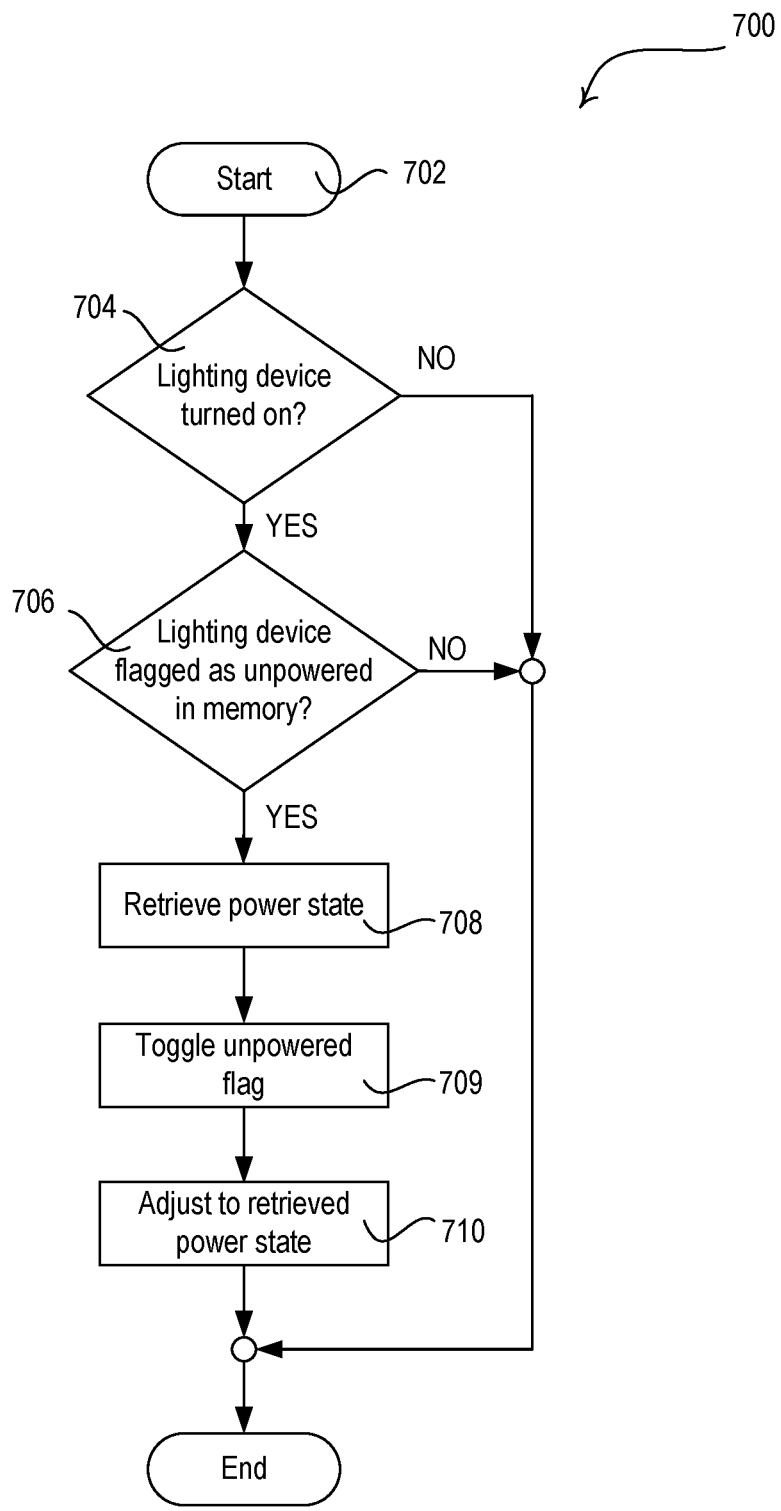
FIGS. 7 and 8 are simplified flowcharts of example methods for performing state correction after power removal events.

FIG. 7 is a simplified flowchart of an example procedure 700 for performing state correction after a power removal event (e.g., a system power removal event). For example, state correction may include setting a lighting device that has experienced a system power removal event to the state of the lighting device prior to the system power removal event. The procedure 700 may be executed when a state change event is detected after a system power removal event occurs (e.g., after procedure 600 determines that system power removal event occurred and/or the lighting device is flagged as unpowered). For example, the procedure 700 may be executed when a lighting device turns on (e.g., a state change event is detected). The procedure 700 may be performed by a control device, such as a remote control device (e.g., the remote control device 270) and/or a hub device (e.g., the hub device 280). Also, or alternatively, the procedure 700 may be performed in conjunction by both the remote control device and the hub device. For example, certain steps in the procedure 700 may be performed by the remote control device and other steps in the procedure 700 may be performed by the hub device.

The procedure 700 may begin at 702. At 704, the control device may detect a condition indicating that a lighting device (e.g., one or both of the light bulbs 212, 222) has changed states to turn from off to on (e.g., a state change event). As described herein, the control device may detect that the lighting device has turned on via an internal sensing circuit (e.g., a photosensing circuit or a line power sensing circuit). Also, or alternatively, the control device may detect that the lighting device has turned on by receiving or more messages. For example, the control device may receive messages indicating the lighting device has turned on from one or more external input devices (e.g., the occupancy sensor 260, daylight sensor 262, remote control device 250, remote control device 270 etc.). Also, or alternatively, the lighting device may be configured to broadcast one or more messages after turning on, and the control device may receive the message indicating that the lighting device has turned on.

At 706, the control device may determine whether the lighting device is flagged as unpowered in memory (e.g., flagged as experiencing a system power removal event). If at 706, the lighting device is flagged as unpowered, the control device may retrieve a power state for the lighting device at 708. The power state of the lighting device may be a prior power state of the lighting device (e.g., a power state prior to the system power removal event). The control device may also toggle the flag to indicate that the lighting device is no longer unpowered (e.g., no longer experiencing a system power removal event) at 709. At 710, based on the power state retrieved at 708, the control device may adjust the lighting device to the retrieved power state (e.g., by transmitting one or more messages to the lighting device).

After turning back on, a lighting device that experienced a power removal event may be set to an inaccurate lighting level. For example, although the lighting device is to be set to an 80% intensity level, after regaining power the lighting device may output light at 100%. Similarly, although the lighting device is to be set to a 0% intensity level, after regaining power, the lighting device may output light at a 100% intensity level. If the lighting device is set to an inaccurate lighting level, lighting devices in the load control system may not be uniform, which may provide a poor user experience. Also, or alternatively, if the lighting device is set to an inaccurate lighting level, the lighting devices may be set to a state wholly opposite from the state intended by the user (e.g., the lighting device is set to a 100% intensity level after experiencing a system power removal event in the middle of the night and when the lighting device should be set to a 0% intensity level). As described herein, the procedure 700 may set lighting devices to the desired intensity level after experiencing a system power removal event and/or provide a positive user experience.

Figure 8:
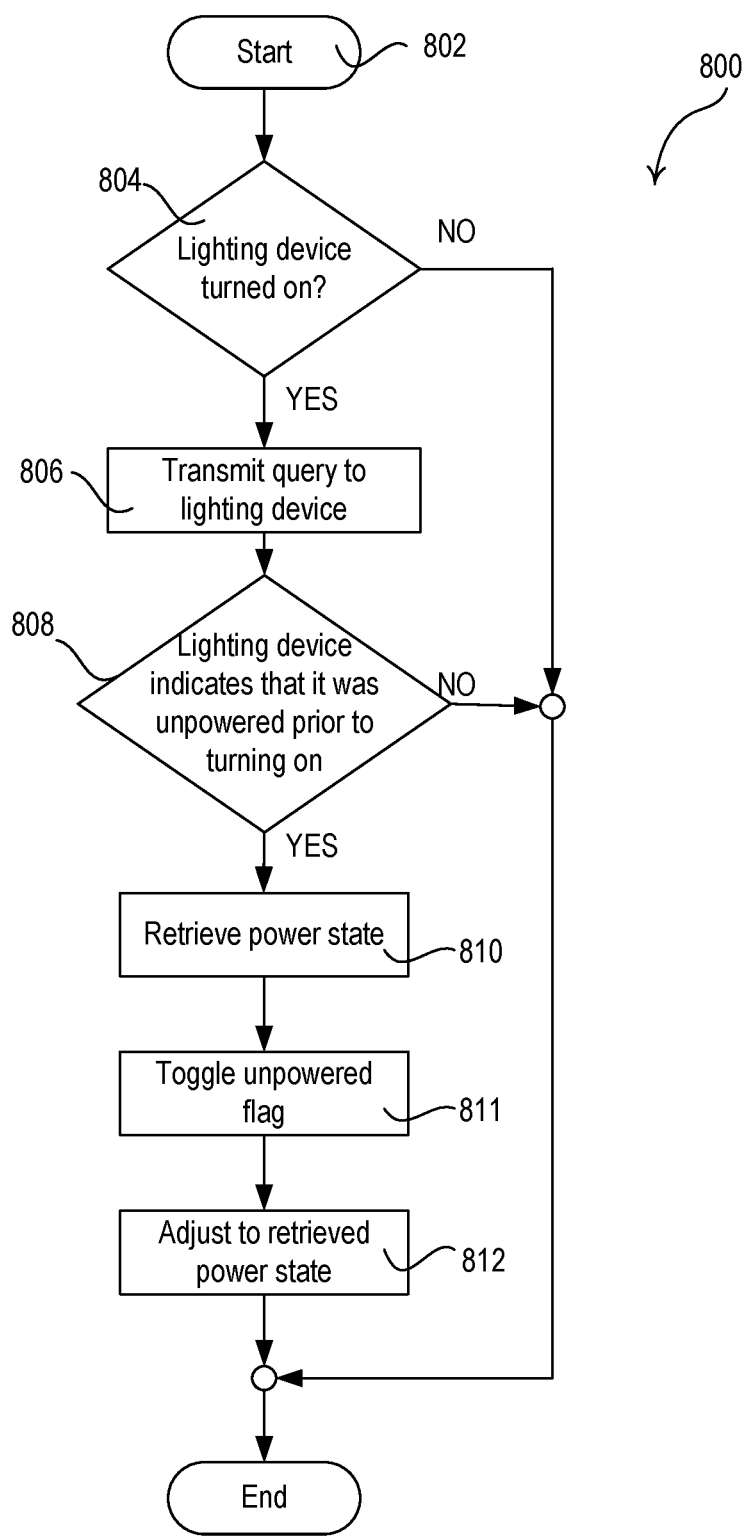

FIG. 8 is another simplified flowchart of an example procedure 800 for detecting power removal events (e.g., system power removal events) and for performing state correction after the system power removal event has ended. The procedure 800 may determine whether a lighting device has experienced a system power removal event when a state change event occurs (e.g., a light turns on). The procedure 800 may be performed by a control device, such as a remote control device (e.g., the remote control device 270) and/or a hub device (e.g., the hub device 280). Also, or alternatively, the procedure 800 may be performed in conjunction by both the remote control device and the hub device. For example, certain steps in the procedure 800 may be performed by the remote control device and other steps in the procedure 800 may be performed by the hub device. Detecting whether the lighting device experienced a system power removal event when a state change event occurs may allow the control device to perform system power removal event detection and state correction contemporaneously (e.g., rather than detecting a system power removal event when the lighting device turns off and then waiting for the light to turn back on to perform state correction).

The procedure 800 may begin at 802. At 804, the control device may detect a condition indicating that a lighting device (e.g., light bulb 212, 222) has changed states to turn from off to on (e.g., a state change event). As described herein, the control device may detect that the lighting device has turned on via an internal sensing circuit (e.g., a photosensing circuit or a line power sensing circuit). Also, or alternatively, the control device may detect that the lighting device has turned on by receiving or more messages. For example, the control device may receive messages from one or more external input devices (e.g., the occupancy sensor 260, daylight sensor 262, remote control device 250, remote control device 270 etc.). Also, or alternatively, as described herein, the lighting device may be configured to broadcast one or more messages after turning on, and the control device may receive the message indicating that the lighting device has turned on.

If the control device determines that lighting device has just turned on at 804, the control device may transmit a query to the lighting device at 806 to determine if the lighting device was unpowered prior to turning on (e.g., experienced a system power removal event). The lighting device itself may maintain and track its state and/or power removal event information and the query transmitted at 806 may request the lighting device's previous state information. For example, the lighting device may determine its previous state information and/or that the lighting device was previously unpowered during a startup routine. At 808, the lighting device may indicate whether it was unpowered prior to turning on (e.g., after experiencing a power removal event). For example, the lighting device may have been unpowered because of a system power removal event. If the lighting device was not unpowered prior to turning on, the procedure 800 may end. If the lighting device was unpowered prior to turning on (e.g., experienced a system power removal event), the control device may retrieve a power state for the lighting device at 810. The power state of the lighting device may be a prior power state of the lighting device (e.g., a power state prior to the system power removal event). The control device may also toggle the flag to indicate that the lighting device is no longer unpowered (e.g., no longer experiencing a system power removal event) at 811.

After a lighting device regains power, a device (e.g., remote control device 270 and/or hub device 280) may perform state correction. For example, state correction may include retrieving a power state of lighting device (e.g., at 810, as illustrated in FIG. 8). The power state of the lighting device may be a prior power state of the lighting device (e.g., a power state prior to the system power removal event). At 812, the lighting device may adjust its power state to the power state retrieved at 810. As described herein, setting the lighting device to a prior power state after regaining power may allow for uniformity among the lighting devices in a load control system and/or may provide a positive user experience. For example, although the lighting device is to be set to an 80% intensity level, after regaining power the lighting device may output light at 100%. Similarly, although the lighting device is to be set to a 0% intensity level, after regaining power, the lighting device may output light at a 100% intensity level. If the lighting device is set to an inaccurate lighting level, lighting devices in the load control system may not be uniform, which may provide a poor user experience. Also, or alternatively, if the lighting device is set to an inaccurate lighting level, the lighting devices may be set to a state wholly opposite from the state intended by the user (e.g., the lighting device is set to a 100% intensity level after experiencing a system power removal event in the middle of the night and when the lighting device should be set to a 0% intensity level). Referring to FIG. 8, for example, if the prior power state of the lighting device was an intensity of sixty percent, the lighting device may adjust its power state to an intensity of sixty percent at 812.

Though the procedure 600 of FIG. 6 and the procedure 800 of FIG. 8 may describe sending a query to an individual lighting device, a query may be sent to other lighting devices or other control devices. For example, when the control device or a hub device detects a condition indicating that a lighting device (e.g., one or both of the light bulbs 212, 222) has changed states to turn from on to off (e.g., a state change event), the control device or the hub device may query other control devices (e.g., other lighting control device(s)) additionally, or alternatively, to determine whether the state change event was a system power removal event. If the other control devices respond to the query, then the state change event may be determined not to be a system power removal event. If the other control devices fail to respond to the query, then the state change event may be determined to be a system power removal event.

The control device or the hub device may also, or alternatively, listen for digital messages being communicated in the load control system to determine whether a system power removal event has occurred. For example, when the control device or a hub device identifies a digital message being communicated to/from a load control device (e.g., one or both of the light bulbs 212, 222) that has changed states to turn from on to off (e.g., a state change event), the control device or the hub device may determine that the state change event was not a system power removal event. The control device or hub device may detect the state change event and detect that one or more digital messages are transmitted to/from the load control device within a predefined period of time after the state change event. The predefined period of time may be within seconds, milliseconds, or another time period less than the time period for the device to power on and establish communications with other devices. The fact that the load control devices continue to transmit and/or receive messages from other devices may indicate that the device is powered on and failed to experience a system power removal event upon the detection of the state change event. Since the To determine whether the state change event was a system power removal event, the control device or hub device may query the load control device identified as experiencing the state change event for an identification of times at which messages were transmitted to/from the load control device. The load control device may keep a log of messages transmitted to/from the load control device and send time-stamps indicating the times at which messages were transmitted to/from the load control device. The control device or hub device may compare the times at which messages were transmitted to/from the load control device with the time at which the state change event was detected to determine whether the state change event was a system power removal event.

The control device or the hub device may also, or alternatively, determine that the state change event was caused by the lighting device receiving control instruction to turn off from the control device or the hub device itself For example, if the internal sensing circuit of the control device or the hub device detects the state change event within a predefined period of time after transmitting a digital message configured to turn the lighting device off, the control device or hub device may determine that the state change event is not a system power removal event. If the internal sensing circuit of the control device or the hub device detects the state change event after the predefined period of time, the control device or hub device may determine that the state change event is a system power removal event.

Similarly, as described herein, the control device or hub device may listen to the messages are transmitted to/from the lighting device or other load control devices in the system prior to a state change event and use the information in the messages to determine whether the state change event is a system power removal event. For example, the control device or hub device may identify messages that include control instructions that are sent to the load control device for changing the state of the load control device (e.g., turning the lighting load off) from another device, or messages that are transmitted from the load control device that indicate a state change event has occurred (e.g., status or heartbeat message). These messages may be detected before the state change event and the control device or the hub device may determine that the subsequent state change event (e.g., occurring within a predefined period of time) at the load control device is not a system power removal event. A lack of messages being transmitted to/from the load control device may be a factor of a number of factors described herein in determining that the state change event is a system power removal event.

Figure 9:
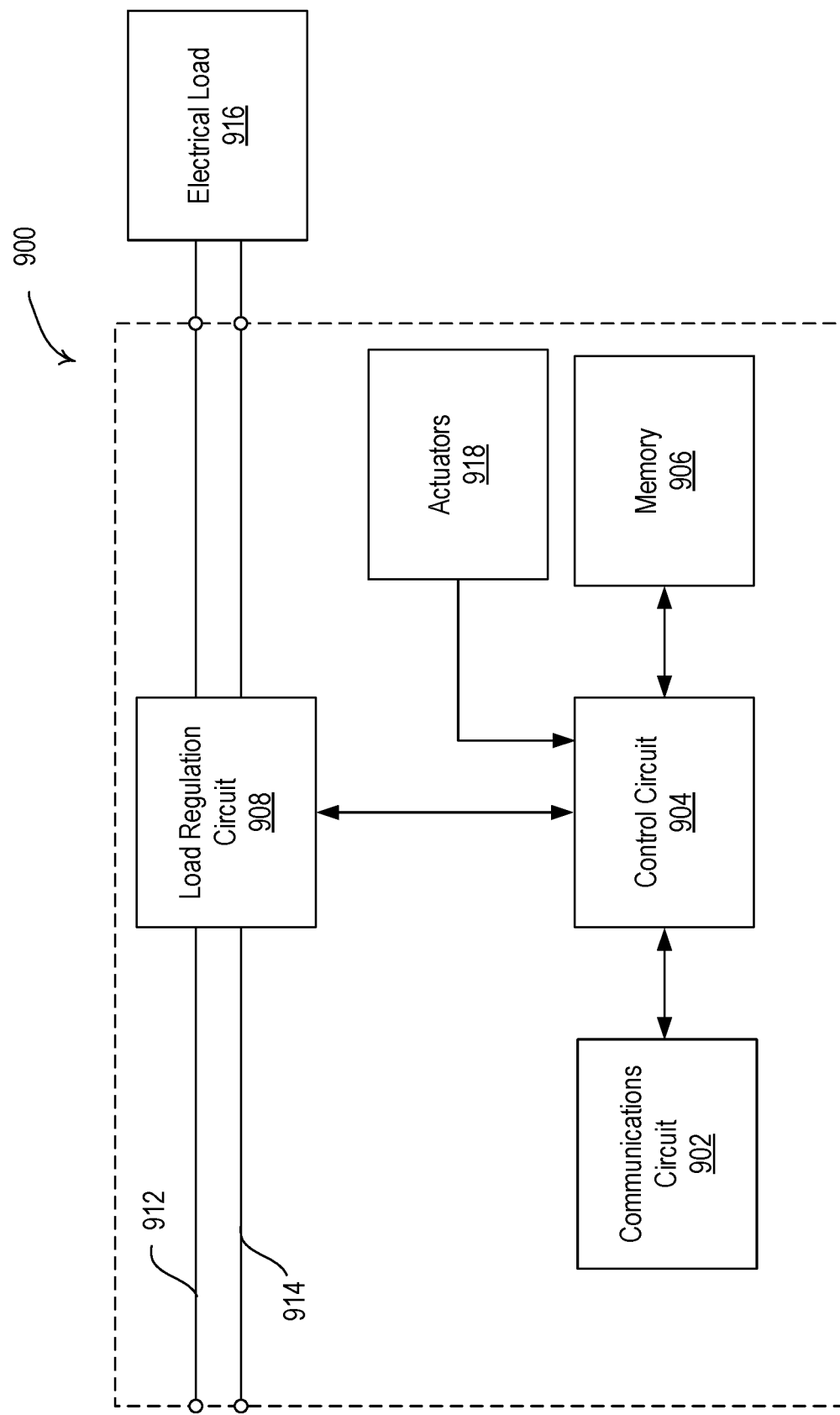
FIG. 9 is a block diagram of an example load control device.

FIG. 9 is a block diagram illustrating an example control device 900, e.g., a load control device, as described herein. The control device 900 may be a lighting device (e.g., the light bulb 212, such as shown in FIG. 2). The control device 900 may be a dimmer device, an electronic switch, an electronic ballast for lamps, an LED driver for LED light sources, an AC plug-in control device, a temperature control device (e.g., a thermostat), a motor drive unit for a motorized window treatment, or other control device. The control device 900 may comprise a load regulation circuit 908 that may control an electrical load 916. The electrical load 916 may include any type of electrical load. For example, the electrical load may be a lighting load and/or a lighting device. The load regulation circuit 908 may receive power via a hot connection 912 and a neutral connection 914 (e.g., for connection to a power source, such as an AC power source) and may provide an amount of power to the electrical load 916. When the control device 900 is a light bulb (e.g., such as the light bulb 212 and/or the light bulb 222), the electrical load 916 may be integral to the control device 900. When the control device 900 is a light bulb and the electrical load is, for example, an LED light source, the load regulation circuit 908 may comprise an LED drive circuit. When the control device 900 is a dimmer device (e.g., such as dimmer device 218, shown in FIG. 2B), the electrical load 916 may be external to the control device (e.g., as shown in FIG. 9) and the control device may be coupled to the electrical load via a single electrical connection. The electrical load 916 may be coupled to the neutral side of the AC power source, and the control device 900 may not include the neutral connection 914 to the neutral side of the AC power source. When the control device 900 is a dimmer device, the load regulation circuit 908 may comprise a dimming circuit for controlling the power delivered to the electrical load using a phase-control technique. The control circuit 904 may determine the status of the electrical load 916 in response to status feedback received from the load regulation circuit 908.

The control device 900 may comprise a control circuit 904 that may control the load regulation circuit 908 for controlling the electrical load 916. The control circuit 904 may include one or more general purpose processors, special purpose processors, conventional processors, digital signal processors (DSPs), microprocessors, integrated circuits, a programmable logic device (PLD), application specific integrated circuits (ASICs), or the like. The control circuit 904 may perform signal coding, data processing, power control, input/output processing, or any other functionality that enables the control device 900 to perform as described herein. The control device 900 may include a communications circuit 902. The communications circuit 902 may include an RF transceiver or other communications circuits capable of performing wired and/or wireless communications via a communications link (e.g., a wireless or wired communication link). The communications circuit 902 may be in communication with the control circuit 904. Though a single communications circuit 902 may be described, the control device 900 may include multiple communication circuits each configured to transmit and/or receive information.

The control circuit 904 may store information in and/or retrieve information from the memory 906. For example, the memory 906 may maintain a registry of associated control devices and/or control configuration instructions. The memory 906 may include a non-removable memory and/or a removable memory.

The control circuit 904 may be in communication with actuators 918 (e.g., one or more buttons) that may be actuated by a user to communicate user selections to the control circuit 904. For example, the actuators 918 may be actuated to put the control circuit 904 in an association mode and/or communicate association messages from the control device 900.

Figure 10:
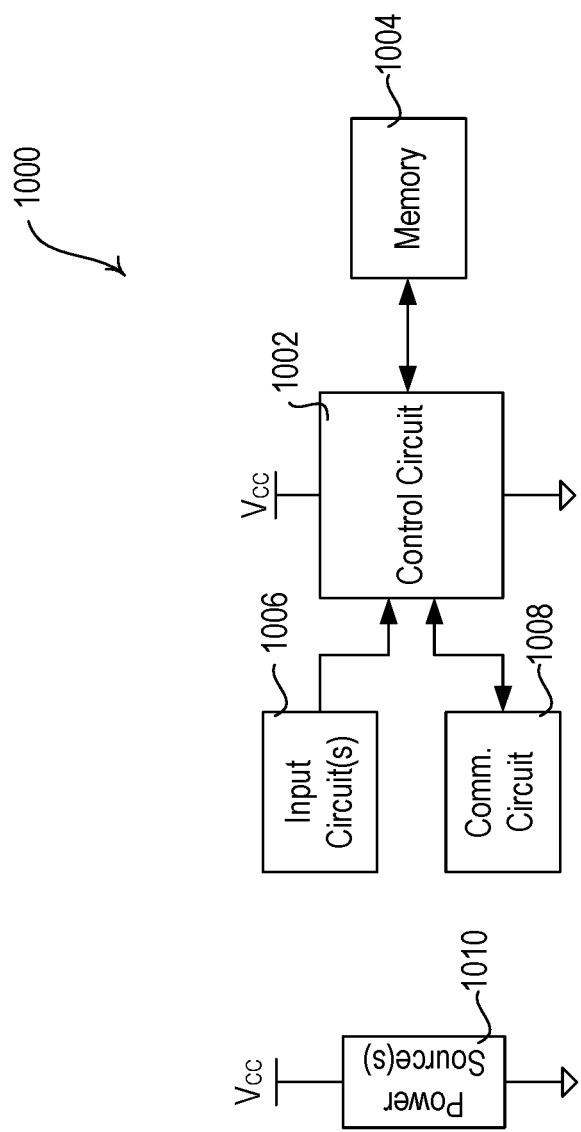
FIG. 10 is a block diagram of an example input device.

FIG. 10 is a block diagram illustrating an example input device 1000 as described herein. The input device 1000 may be a remote control device (such as remote control device 250 and/or remote control device 270), an occupancy sensor, a daylight sensor, a window sensor, a temperature sensor, and/or the like. The input device 1000 may include a control circuit 1002 for controlling the functionality of the input device 1000. The control circuit 1002 may include one or more general purpose processors, special purpose processors, conventional processors, digital signal processors (DSPs), microprocessors, integrated circuits, a programmable logic device (PLD), application specific integrated circuits (ASICs), or the like. The control circuit 1002 may perform signal coding, data processing, power control, input/output processing, or any other functionality that enables the input device 1000 to perform as described herein.

The control circuit 1002 may store information in and/or retrieve information from the memory 1004. The memory 1004 may include a non-removable memory and/or a removable memory, as described herein.

The input device 1000 may include a communications circuit 1008 for transmitting and/or receiving information. The communications circuit 1008 may transmit and/or receive information via wired and/or wireless communications. The communications circuit 1008 may include a transmitter, an RF transceiver, or other circuit capable of performing wired and/or wireless communications. The communications circuit 1008 may be in communication with control circuit 1002 for transmitting and/or receiving information. Though a single communications circuit 1008 may be described, the input device 1000 may include multiple communication circuits each configured to transmit and/or receive information.

The control circuit 1002 may also be in communication with one or more input circuit(s) 1006. The one or more of the input circuit(s) 1006 may include an actuator (e.g., one or more buttons) for receiving input from a user. One or more of the input circuit(s) 1006 may include a sensing circuit, such as an occupancy sensing circuit, a photosensing circuit, a line power sensing circuit (e.g., a line voltage sensing circuit and/or a line current sensing circuit), and/or a temperature sensing circuit, for example. The input circuit(s) 1006 may be configured for receiving and/or sensing information that may be sent to the control circuit 1002 for further processing, such as configuration and/or control of an electrical load. For example, the input circuit(s) 1006 may include an actuator that receives input from an actuation that is sent to the control circuit 1002 to send control instructions to an electrical load or put the control circuit 1002 in an association mode and/or communicate association messages from the input device 1000. The input circuit(s) 1006 may include a sensing circuit capable of sensing information and sending the sensed information to the control circuit 1002 for subsequent processing. For example, the input circuit(s) 1006 may include a photosensing circuit capable of detecting light emission from a lighting device or light source. The input circuit(s) 1006 may include an occupancy sensing circuit that may include an infrared (IR) or visible light sensor circuit capable of detecting movement in a space. The input circuit(s) 1006 may include a temperature sensing circuit capable of detecting a temperature or change in temperature within the space. The control circuit 1002 may receive information from the input circuit(s) 1006 (e.g., an indication that a button has been actuated or sensed information) and may respond with a subsequent processing as described herein.

The input circuit(s) 1006 may include a line power sensing circuit capable of detecting a change in power provided to an electrical load. For example, the line power sensing circuit may comprise a line voltage sensing circuit capable of detecting a change in voltage provided to the electrical load and/or a line current sensing circuit capable of detecting a change in current supplied to the electrical load. For example, the line current sensing circuit may comprise a magnetic sensing circuit (e.g., a Hall-effect sensing circuit) configured to sense magnetic fields caused by the current (e.g., a change in the magnitude of the current) supplied to the electrical load. For example, when the input device 1000 is a remote control device mounted over a actuator of a light switch (e.g., the remote control device 250 mounted over the toggle actuator 216 of the wall-mounted load control device 210), the line current sensing circuit in the remote control device may be configured to sense magnetic fields caused by the current (e.g., a change in the magnitude of the current) conducted through the light switch. The control circuit 1002 of the input device 1000 may be configured to detect a state change event to turn on the electrical load in response to detecting, via the line current sensing circuit, a change in the magnitude of the current from a low magnitude (e.g., little or no current flow) to a high magnitude. The magnitude of the current may be below a predefined threshold or above a predefined threshold to be detected as a state change event (e.g., off or on). The control circuit 1002 of the input device 1000 may be configured to detect a state change event to turn off the electrical load in response to detecting, via the line current sensing circuit, a change in the magnitude of the current from a high magnitude to a low magnitude.

Each of the circuits within the input device 1000 may be powered by one or more power source(s) 1010. The one or more power source(s) 1010 may include an AC power supply and/or DC power supply, for example. The DC power supply may include a battery source for example. The input device 1000 may shift to the DC power supply when the AC power supply is unavailable, such as during a power removal event, for example. In another example, the input device may be powered by a single power source, such as the AC power supply.

Figure 11:
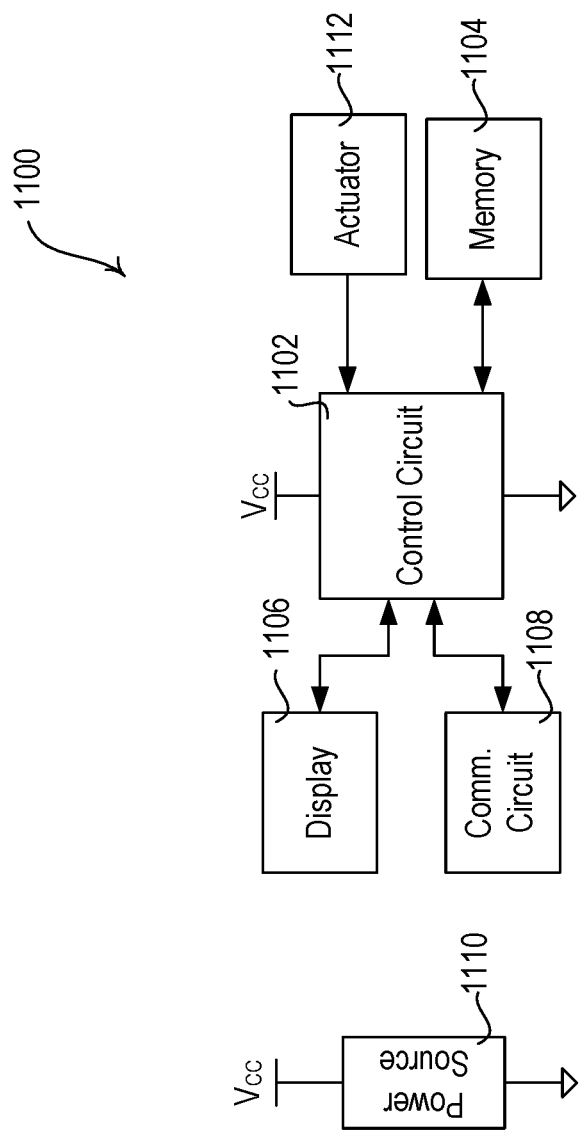
FIG. 11 is a block diagram of an example network device.

FIG. 11 is a block diagram illustrating an example network device 1100 as described herein. The network device 1100 may include the network device 290, shown in FIGS. 2A-2D, for example. The network device 1100 may include a control circuit 1102 for controlling the functionality of the network device 1100. The control circuit 1102 may include one or more general purpose processors, special purpose processors, conventional processors, digital signal processors (DSPs), microprocessors, integrated circuits, a programmable logic device (PLD), application specific integrated circuits (ASICs), or the like. The control circuit 1102 may perform signal coding, data processing, power control, input/output processing, or any other functionality that enables the network device 1100 to perform as described herein. The control circuit 1102 may store information in and/or retrieve information from the memory 1104. The memory 1104 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 1100 may include a communications circuit 1108 for transmitting and/or receiving information. The communications circuit 1108 may perform wireless and/or wired communications. The communications circuit 1108 may include an RF transceiver or other circuit capable of performing wireless communications via an antenna. Communications circuit 1108 may be in communication with control circuit 1102 for transmitting and/or receiving information. Though a single communications circuit 1108 may be described, the network device 1100 may include multiple communication circuits each configured to transmit and/or receive information.

The control circuit 1102 may also be in communication with a display 1106 for providing information to a user. The processor 1102 and/or the display 1106 may generate GU is for being displayed on the network device 1100. The display 1106 and the control circuit 1102 may be in two-way communication, as the display 1106 may include a touch screen capable of receiving information from a user and providing such information to the control circuit 1102. The network device may also include an actuator 1112 (e.g., one or more buttons) that may be actuated by a user to communicate user selections to the control circuit 1102.

Each of the circuits within the network device 1100 may be powered by a power source 1110. The power source 1110 may include an AC power supply or DC power supply, for example. The power source 1110 may generate a supply voltage Vcc for powering the circuits within the network device 1100.

Figure 12:
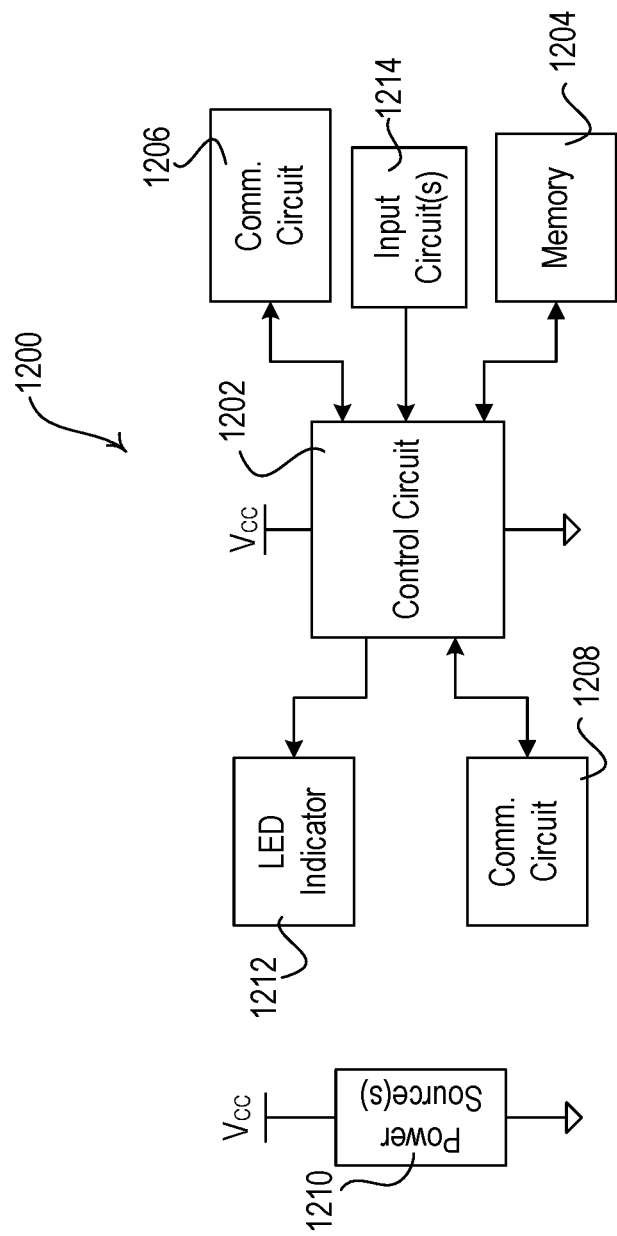
FIG. 12 is a block diagram of an example hub device.

FIG. 12 is a block diagram illustrating an example hub device 1200 as described herein. The hub device 1200 may include a control circuit 1202 for controlling the functionality of the hub device 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), or the like. The control circuit 1202 may perform signal coding, data processing, power control, input/output processing, or any other functionality that enables the hub device 1200 to perform as described herein. The control circuit 1202 may store information in and/or retrieve information from the memory 1204. The memory 1204 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The hub device 1200 may include a communications circuit 1206 for transmitting and/or receiving information. The communications circuit 1206 may perform wireless and/or wired communications. The hub device 1200 may also, or alternatively, include a communications circuit 1208 for transmitting and/or receiving information. The communications circuit 1206 may perform wireless and/or wired communications. Communications circuits 1206 and 1208 may be in communication with control circuit 1202. The communications circuits 1206 and 1208 may include RF transceivers or other communications circuits capable of performing wireless communications via an antenna. The communications circuit 1206 and communications circuit 1208 may be capable of performing communications via the same communication channels or different communication channels. For example, the communications circuit 1206 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 1208 may be capable of communicating (e.g., with control devices and/or other devices in the load control system) via another wireless communication channel (e.g., WI-FI® or a proprietary communication channel, such as CLEAR CONNECT™).

The control circuit 1202 may be in communication with an LED indicator 1212 for providing indications to a user. The control circuit 1202 may also be in communication with one or more input circuit(s) 1214. The one or more of the input circuit(s) 1214 may include an actuator (e.g., one or more buttons) for receiving input from a user. One or more of the input circuit(s) 1214 may include a sensing circuit, such as an occupancy sensing circuit, a photosensing circuit, a line power sensing circuit, and/or a temperature sensing circuit, for example. The input circuit(s) 1214 may be configured for receiving and/or sensing information that may be sent to the control circuit 1202 for further processing, such as configuration and/or control of an electrical load. For example, the input circuit(s) 1214 may include an actuator that receives input from an actuation that is sent to the control circuit 1202 to send control instructions to an electrical load or put the control circuit 1202 in an association mode and/or communicate association messages from the hub device 1200. The input circuit(s) 1214 may include a sensing circuit capable of sensing information and sending the sensed information to the control circuit 1202 for subsequent processing. For example, the input circuit(s) 1214 may include a photosensing circuit capable of detecting light emission from a lighting device or light source. The input circuit(s) 1214 may include an occupancy sensing circuit that may include an infrared (IR) or visible light sensor circuit capable of detecting movement in a space. The input circuit(s) 1214 may include a temperature sensing circuit capable of detecting a temperature or change in temperature within the space. The control circuit 1202 may receive information from the input circuit(s) 1214 (e.g., an indication that a button has been actuated or sensed information) and may respond with a subsequent processing as described herein.

Each of the circuits within the hub device 1200 may be powered by one or more power source(s) 1210. The power source(s) 1210 may include an AC power supply and/or a DC power supply, for example. The DC power supply may include a battery source, for example. The hub device 1200 may shift to the DC power supply when the AC power supply is unavailable, such as during a power removal event, for example. In another example, the hub device 1200 may be powered by a single power source, such as the AC power supply. The power source 1210 may generate a supply voltage Vcc for powering the circuits within the hub device 1200.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A control device, comprising:
a sensing circuit capable of sensing an indication of a state change event for changing a state of a lighting load;
a communication circuit; and
a control circuit configured to:
receive, from the sensing circuit, the indication of the state change event;
determine that the lighting load lost power due to a system power removal event prior to the indication of the state change event turning on the lighting load; and
after the lighting load is determined to have lost power due to the system power removal event that occurred prior to the indication of the state change event turning on the lighting load, transmit, via the communication circuit, a command for controlling the lighting load via the communication circuit, wherein the command is configured to set the lighting load to a previous state of the lighting load prior to the system power removal event.

2. The control device of claim 1, wherein:
the sensing circuit is a photosensing circuit capable of detecting light emission from the lighting load; and
the indication of the state change event turning on the lighting load comprises a detection of a change in the light emission from the lighting load.

3. The control device of claim 1, wherein:
the sensing circuit is a line current sensing circuit configured to detect a current conducted by the lighting load; and
the indication of the state change event turning on the lighting load comprises a change in the current being supplied to the lighting load.

4. The control device of claim 1, the control circuit further configured to transmit, via the communication circuit, a query to a hub device to determine the previous state of the lighting load.

5. The control device of claim 1, wherein the message is a first message, and wherein the control circuit is configured to determine that the lighting load lost power due to a system power removal event by being configured to:
receive an indication of a state change event turning off the lighting load from the sensing circuit,
send a second message, in response to the indication of the state change event turning off the lighting load, to a load control device configured to control the lighting load; and
fail to receive a response to the second message within a timeout period of time.

6. The control device of claim 5, the control circuit further configured to flag the lighting load as unpowered in a memory, when the response to the second message is not received from the load control device within the timeout period of time.

7. The control device of claim 1, wherein the control circuit is configured to store state information in a memory and wherein the control circuit is further configured to determine the previous state of the lighting load via the memory.

8. The control device of claim 1, wherein the control circuit being configured to determine that the lighting load lost power due to a system power removal event prior to the state change event turning on the lighting load further comprises the control circuit being configured to:
send a query, in response to the indication of the state change event turning on the lighting load, to a load control device configured to control the lighting load; and
receive an indication from the load control device, in response to the query, indicating that the lighting load lost power due to the system power removal event prior to the state change event turning on the lighting load.

9. The control device of claim 1, wherein the control circuit being configured to determine that the lighting load lost power due to a system power removal event prior to the state change event turning on the lighting load further comprises the control circuit being configured to:
send a query, in response to the indication of the state change event turning on the lighting load, to a first load control device other than a second load control device configured to control the lighting load; and
receive an indication from the first load control device, in response to the query, indicating that a second lighting load controllable by the first load control device lost power due to the system power removal event prior to the state change event turning on the lighting load.

10. The control device of claim 1, further comprising an actuator configured to receive a user input, wherein the control circuit is configured to transmit a second command for controlling the lighting load in response to an actuation of the actuator.

11. A method comprising:
receiving, from a sensing circuit on a control device, an indication of a state change event for changing a state of a lighting load;
determining that the lighting load lost power due to a system power removal event prior to the indication of the state change event turning on the lighting load; and
after the lighting load is determined to have lost power due to the system power removal event that occurred prior to the indication of the state change event turning on the lighting load, transmitting a command for controlling the lighting load via the communication circuit, wherein the command is configured to set the lighting load to a previous state of the lighting load prior to the system power removal event.

12. The method of claim 11, wherein the sensing circuit is a photosensing circuit capable of detecting light emission from the lighting load, and wherein the indication of the state change event turning on the lighting load comprises a detection of a change in the light emission from the lighting load.

13. The method of claim 11, wherein the sensing circuit is a line current sensing circuit configured to detect a current conducted by the lighting load, and wherein the indication of the state change event turning on the lighting load comprises a change in the current being supplied to the lighting load.

14. The method of claim 11, further comprising transmitting a query to a hub device to determine the previous state of the lighting load.

15. The method of claim 11, wherein the message is a first message, and wherein determining that the lighting load lost power due to a system power removal event further comprises:
receiving an indication of a state change event turning off the lighting load from the sensing circuit;
sending a second message, in response to the indication of the state change event turning off the lighting load, to a load control device configured to control the lighting load; and
failing to receive a response to the second message within a timeout period of time.

16. The method of claim 15, further comprising:
flagging the lighting load as unpowered in a memory, when the response to the second message is not received from the load control device within the timeout period of time.

17. The method of claim 11, further comprising:
storing state information in a memory, and wherein the previous state of the lighting load is determined via the memory.

18. The method of claim 11, wherein determining that the lighting load lost power due to a system power removal event prior to the state change event turning on the lighting load further comprises:
sending a query, in response to the indication of the state change event turning on the lighting load, to a load control device configured to control the lighting load; and
receiving an indication from the load control device, in response to the query, indicating that the lighting load lost power due to the system power removal event prior to the state change event turning on the lighting load.

19. The method of claim 11, wherein determining that the lighting load lost power due to a system power removal event prior to the state change event turning on the lighting load further comprises:
sending a query, in response to the indication of the state change event turning on the lighting load, to a first load control device other than a second load control device configured to control the lighting load; and
receiving an indication from the first load control device, in response to the query, indicating that a second lighting load controllable by the first load control device lost power due to the system power removal event prior to the state change event turning on the lighting load.

20. The method of claim 11, further comprising:
receiving an actuation via an actuator; and
transmitting a second command for controlling the lighting load in response to the actuation of the actuator.

* * * * *